(12) United States Patent
Matsugu et al.

(10) Patent No.: US 8,180,106 B2
(45) Date of Patent: May 15, 2012

(54) IMAGE CAPTURING APPARATUS AND IMAGE CAPTURING METHOD

(75) Inventors: Masakazu Matsugu, Yokohama (JP); Katsuhiko Mori, Kawasaki (JP); Yuji Kaneda, Kawasaki (JP); Tadashi Hayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/691,072

(22) Filed: Jan. 21, 2010

(65) Prior Publication Data

US 2010/0118163 A1 May 13, 2010

Related U.S. Application Data

(62) Division of application No. 11/459,112, filed on Jul. 21, 2006.

(30) Foreign Application Priority Data

Jul. 26, 2005 (JP) .................................. 2005-215981
Sep. 20, 2005 (JP) .................................. 2005-272885

(51) Int. Cl.
*G06K 9/00* (2006.01)

(52) U.S. Cl. ........................................ 382/103; 382/118

(58) Field of Classification Search .......... 382/141–152, 382/115–118, 103
See application file for complete search history.

(56) References Cited

U.S. PATENT DOCUMENTS

| | | | |
|---|---|---|---|
| 4,247,203 A * | 1/1981 | Levy et al. ..................... 356/398 |
| 5,229,850 A | 7/1993 | Toyoshima | |
| 5,323,470 A | 6/1994 | Kara et al. ..................... 382/103 |
| 5,689,575 A * | 11/1997 | Sako et al. ..................... 382/118 |
| 5,699,447 A * | 12/1997 | Alumot et al. ................. 382/145 |
| 5,774,591 A | 6/1998 | Black et al. | |
| 5,926,218 A | 7/1999 | Smith ....................... 348/207.99 |
| 5,969,755 A | 10/1999 | Courtney | |
| 6,510,240 B1 * | 1/2003 | Koduri et al. ................. 382/146 |
| 6,606,397 B1 * | 8/2003 | Yamamoto ..................... 382/117 |

(Continued)

FOREIGN PATENT DOCUMENTS

EP 1 333 403 A2 8/2003

(Continued)

OTHER PUBLICATIONS

Byers, et al., "An Autonomous Robot Photographer," Proceedings of the 2003 IEEE/RSJ International Conference on Intelligent Robots and Systems, Las Vegas, NV (Oct. 2003), pp. 2636-2642.

(Continued)

*Primary Examiner* — Alex Liew
(74) *Attorney, Agent, or Firm* — Fitzpatrick, Cella, Harper & Scinto

(57) ABSTRACT

In an image capturing apparatus, a video input unit (2) captures the image of an object and sequentially acquires image data associated with the image capturing, a model data memory (6) stores model data associated with the first feature quantity calculated from a feature point of the object in a model image, a principal object detection unit (3) calculates the second feature quantity from a feature point of the object in the acquired image data, a state change estimation unit (4) estimates, on the basis of the second feature quantity and the model data, the timing when the object satisfies a predetermined condition, and an image input processing control unit (7) stores the image data corresponding to the estimated timing in an image recording unit (5). This configuration makes the image capturing apparatus acquire an image in a more proper state without large-capacity memory.

14 Claims, 25 Drawing Sheets

U.S. PATENT DOCUMENTS

| | | | |
|---|---|---|---|
| 7,233,684 B2 | 6/2007 | Fedorovskaya et al. | 382/118 |
| 7,792,335 B2 | 9/2010 | Steinberg et al. | |
| 2002/0135618 A1 | 9/2002 | Maes et al. | 715/767 |
| 2002/0149693 A1 | 10/2002 | Tantalo et al. | 348/362 |
| 2003/0025800 A1 | 2/2003 | Hunter et al. | 348/208.13 |
| 2003/0160879 A1* | 8/2003 | Robins et al. | 348/239 |
| 2003/0177500 A1* | 9/2003 | Nakamura et al. | 725/105 |
| 2004/0212677 A1 | 10/2004 | Uebbing | 348/155 |
| 2004/0218916 A1 | 11/2004 | Yamaguchi et al. | 396/263 |
| 2005/0104968 A1 | 5/2005 | Aoki et al. | 348/207.99 |
| 2005/0264650 A1* | 12/2005 | Park et al. | 348/36 |
| 2005/0271280 A1 | 12/2005 | Farmer et al. | 382/224 |
| 2006/0204106 A1* | 9/2006 | Yamaguchi | 382/203 |

FOREIGN PATENT DOCUMENTS

| | | |
|---|---|---|
| GB | 2 400 999 A | 10/2004 |
| JP | 7-143439 | 6/1995 |
| JP | 7-220090 | 8/1995 |
| JP | 8-278528 | 10/1996 |
| JP | 9-130714 | 5/1997 |
| JP | 11-69222 | 3/1999 |
| JP | 11-136557 A | 5/1999 |
| JP | 3078166 B2 | 8/2000 |
| JP | 2000-259833 | 9/2000 |
| JP | 2001-094923 A | 4/2001 |
| JP | 3200950 B2 | 8/2001 |
| JP | 3240339 B2 | 12/2001 |
| JP | 2002-008031 | 1/2002 |
| JP | 2002-008032 | 1/2002 |
| JP | 2002-008033 | 1/2002 |
| JP | 2003-125344 | 4/2003 |
| JP | 2004-180076 A | 6/2004 |
| JP | 2004-294498 | 10/2004 |
| JP | 2004-328736 | 11/2004 |
| WO | WO 99/45511 A | 9/1999 |
| WO | WO 02/093916 A2 | 11/2002 |

OTHER PUBLICATIONS

Sep. 19, 2006 Search Report in European Patent Application No. 06 01 5037.

Dec. 11, 2006 European Search Report in European Patent Appln. No. 06015037.

* cited by examiner

HIGH-PIXEL-COUNT RECORDED FRAME
960
1280
240
320
NORMAL MOVING IMAGE FRAME

IMAGE CAPTURING APPARATUS AND IMAGE CAPTURING METHOD

This application is a division of application Ser. No. 11/459,112 filed Jul. 21, 2006.

BACKGROUND OF THE INVENTION

1. Field of the Invention

The present invention relates to an image capturing apparatus and, more particularly, to an image capturing apparatus which automatically captures an image in accordance with image capturing conditions. The present invention also relates to an image capturing technique of simultaneously photographing moving and still images.

2. Description of the Related Art

There has conventionally been known a technique associated with an image capturing apparatus which automatically captures an image in accordance with image capturing conditions.

Japanese Patent Laid-Open No. 2000-259833 discloses a technique of determining the state of a person's face from successive images and selecting an image exhibiting an optimal face state.

Japanese Patent No. 3240339 discloses a technique of, when an image at a timing desired by the user does not exist, performing interpolation processing using pixel correspondence between different images for recorded moving image data, and thereby generating an image at the timing desired by the user.

There has also conventionally been known a technique of tracking the motion of an object and photographing the object.

Japanese Patent No. 3200950 discloses a technique of extracting a partial template from an image and tracking an object on the basis of the correlation between the template and an input image. In tracking, the template is divided, integrated, and updated on the basis of the tracking log and the knowledge of the object. The behavior pattern of an object is learned, and the correlation calculation range is determined on the basis of future behavior prediction.

There is known a technique of, when detecting the position of a target object on the basis of the minimum residual between an input image and reference image data, detecting an operation (speed) based on two positions of the target object that are detected in time series or an acceleration based on three positions, and further calculating a predicted position. Still another technique is known for a correlation tracking system having a means for finding out a template of the largest coincidence from a plurality of templates for a target whose shape changes, sequentially calculating a motion vector to the position of the template, and tracking the target.

According to the above-described techniques, an image in an optimal face state can be determined and selected from a string of images stored in a memory after the images are input. However, the timing when an image in an optimal state is input cannot be set or predicted. Thus, in order to select an image, unnecessary image data must be recorded, requiring a large-capacity memory. It is difficult to satisfactorily track an object state which changes at high speed, and obtain a high-quality image at a normal recording rate. Further, interpolation does not always provide an image at a desired timing.

It is difficult to track a moving object when the illumination condition changes or the image capturing apparatus itself moves.

In a configuration disclosed in Japanese Patent No. 3200950, an object is tracked on the basis of the correlation between the template and a portion extracted from an input image. However, it is generally hard to properly set a partial area to be extracted from an input image. When a tracked object is out of focus upon variations in photographing conditions or the illumination condition varies, the performance to track an object which moves and changes at high speed cannot be maintained. If a pattern of a motion vector similar to an object during tracking exists on the background, the background object may be erroneously recognized and tracked.

On the other hand, there has conventionally been known a hybrid camera capable of photographing by switching between moving images and still images higher in pixel count and image quality than moving images.

As a technique capable of recording a high-pixel-count still image during recording of a moving image or the like at a low pixel count, high-pixel-count still image is recorded by pressing the mode button, as described in, e.g., Japanese Patent Laid-Open No. 2003-125344 (FIG. 22).

There is also known a technique of switching the photographing mode to a high-quality mode externally by wireless communication as described in Japanese Patent Laid-Open No. 11-069222 (FIG. 23). If the shutter button is pressed in step S61010 of FIG. 22, recording is done with a normal moving image frame in FIG. 24 (320×240 pixels in FIG. 24). If the high-quality mode button is pressed in step S61014, a frame of high-pixel-count recording (1,280×960 pixels in FIG. 24) is inserted between moving image frames. In FIG. 23, an external controller 6107 switches between high-speed photographing and high-quality photographing by controlling a recording mode control unit 6104 and photographing control unit 6105 of an image capturing apparatus 6101 via a wireless communication unit made up of a reception unit 6103, antennas 6106 and 6111, and a transmission unit 6110.

As a method of determining a photo opportunity for more desirable photographing, there is proposed a method of automatically determining a photo opportunity by a camera to take a picture when an object shows a desirable facial expression or pose, as described in Japanese Patent Laid-Open No. 2004-294498 (FIG. 25). In the example of FIG. 25, an image capturing unit 6202 repetitively acquires images. When a control unit 6209 determines that a preset condition is satisfied, it controls the focus and diaphragm of the image capturing unit 6202 to take a picture. Note that the photo opportunity is determined by extracting a shape representing the facial expression of a person or the like from an image, calculating the coincidence between the extracted shape and a predetermined shape, and when the coincidence exceeds a predetermined value, determining the current timing as a photo opportunity to photograph an object.

There is a demand to record, at high image quality without influencing recording of a moving image, a photo opportunity for an instantaneous facial expression which appears during moving image photographing. For this purpose, according to the techniques disclosed in Japanese Patent Laid-Open Nos. 2003-125344 and 11-069222, moving image photographing can switch to high-pixel-count still image photographing. The user waits for a photo opportunity while photographing a moving image, and can photograph a desirable still image.

However, a time lag is generated in switching from the moving image photographing mode to the still image photographing mode, and the user may miss a photo opportunity in pressing the shutter button. As a result, photographing likely fails because an advanced technique of, e.g., predicting a change and releasing the shutter is required to prevent an image in which the eyes of an object are shut due to an instantaneous blink, or to capture the moment of a good facial expression such as a smile. In Japanese Patent Laid-Open No. 11-069222, moving image photographing is interrupted by high-quality photographing, so moving image recording is intermitted for a long time.

In Japanese Patent Laid-Open No. 2004-294498, the camera automatically determines a photo opportunity, and the user himself need not release the trigger at a photo opportunity. The camera determines the next photo opportunity from images photographed in the past and shifts to a photographing operation. Thus, a time lag in the operation of the AF, diaphragm, or the like, or a time lag such as the time difference between frames is generated, and an instantaneous photo opportunity may be missed. In addition, no moving image can be photographed at the same time as a still image because the image capturing unit 6202 is occupied for photographing of the still image.

A two-lens configuration is also conceivable in which a moving image photographing system and a high-quality photographing system including a system for detecting a face such as a facial expression are designed as separate optics and stored in one housing. However, the apparatus becomes bulky, and it is difficult to control the two optics in synchronism with each other. Moreover, the two optics do not always coincide with each other in view angle, focus status, and F-number, and an intended image is less likely obtained.

SUMMARY OF THE INVENTION

The present invention has been made to overcome the conventional drawbacks, and has as its object to provide a technique associated with an image capturing apparatus which does not require any large-capacity memory and can acquire an image in a more proper state. It is another object of the present invention to provide a technique capable of simultaneously photographing moving images which are successively photographed, and high-quality still images, and photographing high-quality still images without influencing moving image photographing and missing any photo opportunity.

In order to achieve the above objects, an image capturing apparatus, according to the present invention comprises the following configuration. More specifically, an image capturing apparatus comprises an image capturing unit adapted to capture an image of an object and sequentially acquire image data associated with the image capturing, a storage unit adapted to store model data associated with a first feature quantity calculated from a feature point of the object in a model image, a calculation unit adapted to calculate a second feature quantity from a feature point of the object in the acquired image data, a first estimation unit adapted to estimate, on the basis of the second feature quantity and the model data, a timing when the object satisfies a predetermined condition, and a control unit adapted to store the image data corresponding to the estimated timing in an image data storage unit.

In order to solve the above problems and achieve the above objects, an image capturing apparatus according to the present invention comprises an image capturing unit adapted to capture an image of an object and acquire image data, a holding control unit adapted to simultaneously acquire first image data and second image data from the image capturing unit, have a first data holding unit temporarily hold the first image data, and have a second holding unit temporarily hold the second image data, an analysis unit adapted to analyze a state of the object by using the second image data, and a recording control unit adapted to control successively recording the second image data on a recording medium, and control whether to record the first image data on the recording medium on the basis of an analysis result by the analysis unit.

An image capturing method according to the present invention comprises an image capturing step of capturing an image of an object to acquire image data, a data holding step of simultaneously acquiring first image data and second image data in the image capturing step, temporarily holding the first image data in a first data holding unit, and temporarily holding the second image data in a second data holding unit, an analysis step of analyzing a state of the object by using the second image data, and a recording control step of controlling to successively record the second image data on the recording medium, and control whether to record the first image data on the recording medium on the basis of an analysis result in the analysis step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below with reference to the accompanying drawings. However, building components described in the following embodiments are merely an example, and are not construed to limit the scope of the present invention to only them.

First Embodiment

Configuration of Image Capturing Apparatus

Figure 1:
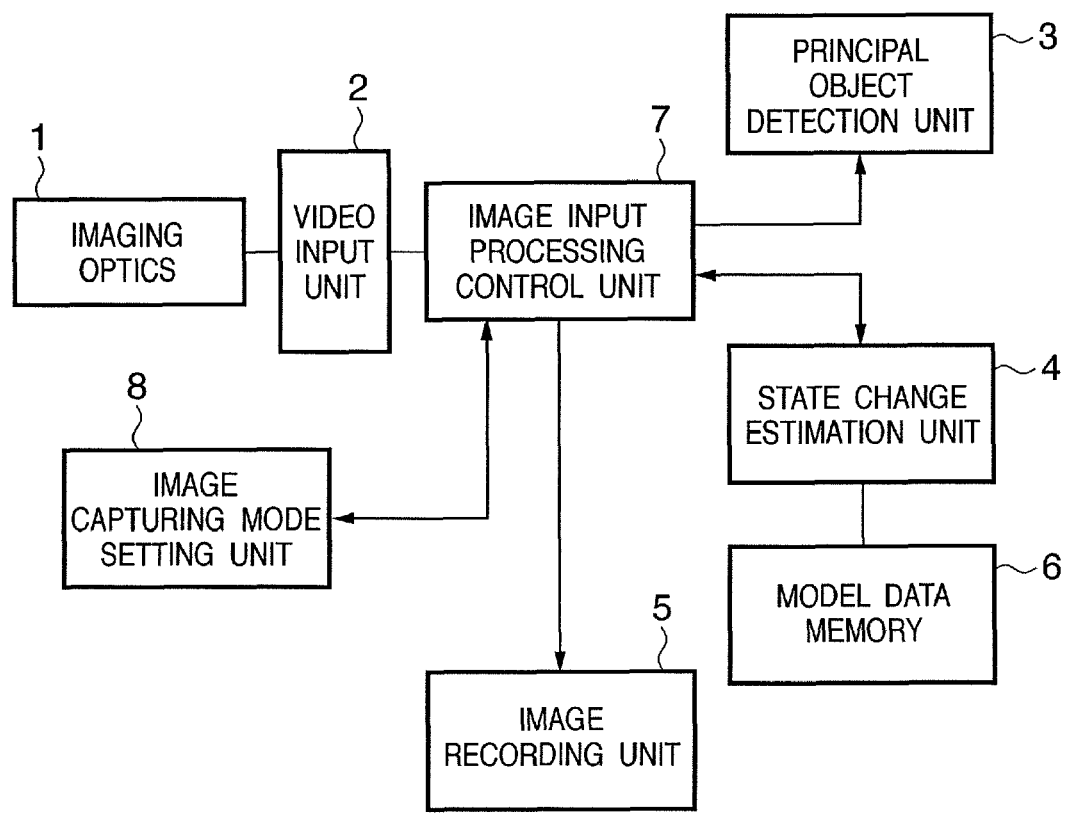
FIG. 1 is a block diagram showing the configuration of the main part of an image capturing apparatus according to the first embodiment.

The configuration of an image capturing apparatus according to the first embodiment will be described with reference to FIG. 1. FIG. 1 is a block diagram showing the configuration of the main part of the image capturing apparatus according to the first embodiment.

As shown in FIG. 1, the image capturing apparatus according to the first embodiment comprises an imaging optics 1, video input unit 2, principal object detection unit 3, state change estimation unit 4, model data memory 6, image input processing control unit 7, image capturing mode setting unit 8, image recording unit 5, and the like. An outline of the function of each building unit is as follows.

The imaging optics 1 comprises of a lens and the like, and forms an image on the basis of light traveling from an object.

The video input unit 2 photoelectrically converts an image formed by the imaging optics 1, and outputs the image as image data. The video input unit 2 is made up of a video (optical) sensor such as a CCD (Charge-Coupled Device), a sensor signal processing circuit, a sensor driving circuit, and the like. The video input unit 2 is typically formed using a CMOS image sensor and the like. The video input unit 2 outputs a predetermined video signal (image data) in response to a read control signal from the sensor driving circuit (not shown). In the first embodiment, input image data is a moving image made up of a plurality of frames.

The principal object detection unit 3 processes image data input from the sensor signal driving (processing) circuit of the video input unit 2, and detects an object in a predetermined category corresponding to an image capturing mode set by the user in the image capturing mode setting unit 8. That is, the principal object detection unit 3 detects, as an object from input image data, an image corresponding to a target in a specific category registered in advance.

The granularity of the object category detected by the principal object detection unit 3 is variable, and can be properly changed on the basis of an instruction input from the user, preset conditions, or the like. Category types vary from, e.g., broad classification classes by persons, cars, and the like, to middle-size classification classes by age and gender of persons, and classes subdivided to each person.

In this case, a specific category is set to a person's face (the face of a specific individual or a general human face), and model data on the face is stored in a model data storage unit 31 (to be described later) in the principal object detection unit 3. Model data on the face for use contains, e.g., face image data, predetermined feature vector data on an entire face that is obtained by principal component analysis or independent component analysis, or local feature data on the characteristic area of each face (e.g., the eyes or mouth of a face).

The state change estimation unit 4 for a principal object estimates a change of the state of the principal object, and estimates the time until the principal object reaches to a specific state category. The state category in the first embodiment is a facial expression. The state change estimation unit 4 predicts and estimates a change of the facial expression, and estimates the timing when the facial expression reaches, a facial expression category (e.g., best smile) registered in advance (to be described later). The state change estimation unit 4 inputs the estimated timing to the image input processing control unit 7.

The model data memory 6 stores a typical image corresponding to the image capturing mode as model data. As shown in FIG. 1, the model data memory 6 can be accessed from the state change estimation unit 4.

The image input processing control unit 7 controls the optimal timing of image input of the video input unit 2 on the basis of an input from the state change estimation unit 4. More specifically, the image input processing control unit 7 generates a control signal at a timing estimated by the state change estimation unit 4, and controls to record, in the image recording unit 5, image data input from the optical sensor of the video input unit 2. With this control, a so-called shutter timing is autonomously set so that an object is automatically photographed in a predetermined state.

The image recording unit 5 records image data, and is formed from a medium such as a flexible disk (FD), CD-ROM, CD-R, CD-RW, PC card, DVD, IC memory card, MO, or memory stick. The image recording unit 5 may also be formed from a hard disk device, RAM, or the like.

The image capturing mode setting unit 8 accepts the setting of an image capturing mode from the user, and is made up of a display, button, touch panel, and the like.

[Overall Processing]

Figure 3:
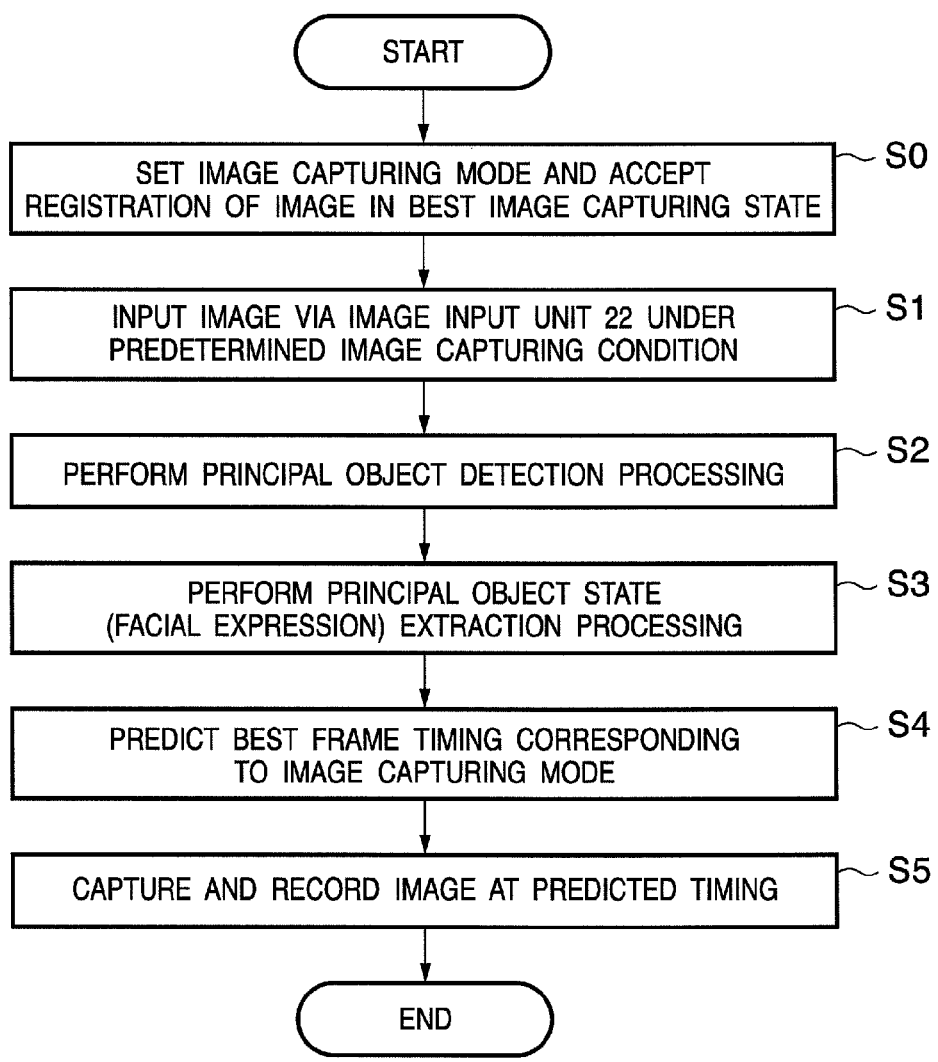
FIG. 3 is a flowchart showing the flow of overall processing according to the first embodiment.

The flow of overall processing in the above configuration will be explained with reference to FIG. 3. FIG. 3 is a flowchart showing the flow of overall processing according to the first embodiment.

In step S0, an image capturing mode is set, and an image corresponding to a best photographing state is registered or selected by the user. The first embodiment will describe a case wherein a facial expression "smile" in which an object smiles with his mouth open is selected by the user as an image capturing mode from the menu window.

In step S1, if the image capturing apparatus according to the first embodiment is oriented to an object, it acquires an image via the image input unit 2.

In step S2, the principal object detection unit 3 detects a principal object (person's face) from the input image.

In step S3, the state change estimation unit 4 determines the state, i.e., facial expression of the detected principal object, and extracts the facial expression.

In step S4, the state change estimation unit 4 predicts the time (best frame timing) when the detected facial expression of the principal object changes to a predetermined one (e.g., smile) corresponding to the image capturing mode.

In step S5, the image input processing control unit 7 controls image capturing at the timing predicted in step S4. Then, the processing ends.

Details of processing in each step will be explained.

[Image Capturing Mode Setting Processing]

Figure 9:
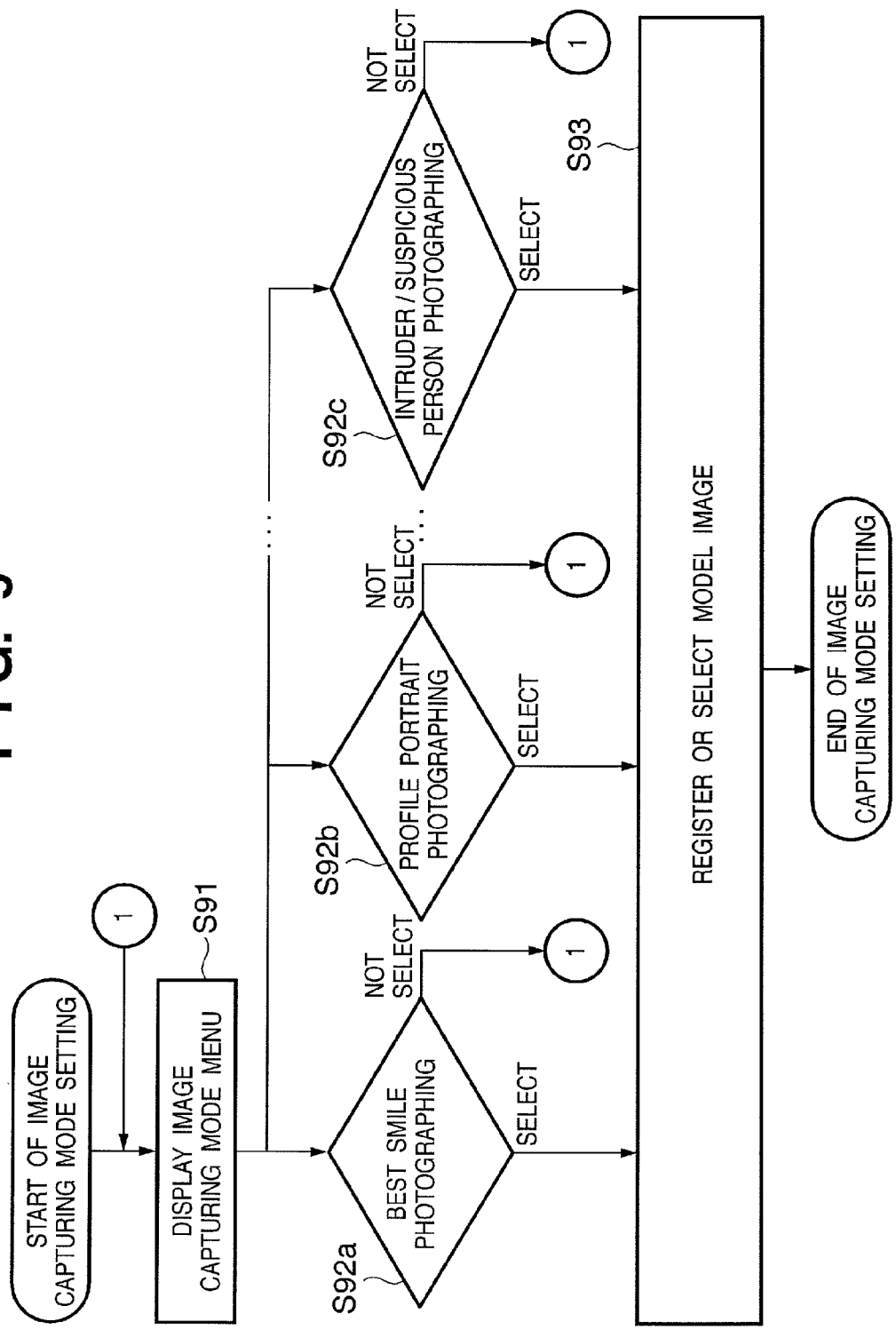
FIG. 9 is a flowchart showing the procedures of setting an image capturing mode in an image capturing mode setting unit.

The image capturing mode setting processing executed in step S0 will be explained with reference to FIG. 9. FIG. 9 is a flowchart showing the procedures of setting an image capturing mode in the image capturing mode setting unit 8.

In step S91, an image capturing mode setting menu is displayed on the display screen (not shown) to accept selection of an image capturing mode by the user.

In step S92, the image capturing mode selected by the user is determined. Selectable image capturing modes can be designed to include, e.g., best smile photographing, profile portrait photographing, and intruder/suspicious person photographing.

Best smile photographing means autonomously photographing an object at the timing when the face of the object person shows the best smile. Profile portrait photographing means autonomously capturing the image of an object at the timing when the face of the object person changes to a profile with an ideal posture or angle. Intruder/suspicious person photographing means autonomously capturing the image of an intruder at the timing when he commits a crime, for example, he is stretching out his hand to jewelry or a safe when the image capturing apparatus according to the first embodiment is installed as a surveillance camera at a predetermined position. The steps (steps S0 to S5) will be explained mainly in the case wherein best smile photographing is selected. The same processing also applies to a case wherein another mode (e.g., profile portrait or intruder/suspicious person photographing) is selected.

In step S93, model image data corresponding to the selected image capturing mode is selected or registered, and the setting of the image capturing mode ends.

Selection of model image data is to select, as model data, an image (data) regarded to be the best from the subject point of view of the user among the images of scenes which have already been registered in correspondence with each mode. The image capturing apparatus according to the first embodiment stores selected image data in the model data memory 6 in correspondence with the image capturing mode. Registration of model image data is to newly photograph a best scene and store its image as model data in the model data memory 6.

Note that model image data may be an image serving as a model, or the above-mentioned model data extracted from an image serving as a model. When, for example, settings are made for the best smile photographing mode, an image serving as a model is the image of the smile of a model person. Similarly, when settings are made for the profile portrait photographing mode, an image serving as a model is the image of an ideal profile. When settings are made for the intruder/suspicious person photographing mode, an image serving as a model includes the image of the person model of a suspicious person who stretches out his hand to a safe. Assume that these images are ideal for the illumination condition, composition, angle, and the like.

Model data contains predetermined feature vector data on an entire image that are extracted from an image serving as a model and obtained by principal component analysis or independent component analysis, and local feature data on a characteristic area of each object.

For example, when a change of a facial expression to a desired smile (best photographing state) is to be predicted, displacement vectors at main feature points (plurality of portions) between an expressionless face and a desired smile are extracted in advance as a motion (displacement) vector distribution model, and stored in the model data memory 6. Note that a motion vector distribution model between frames at predetermined intervals at specific portions (e.g., the end points of the eyes and those of the mouth) corresponding to a predetermined category (e.g., smile) may be stored.

In accordance with the application purpose, model data (including data serving as a model) may be registered separately for each object person, or average data which applies to ordinary people may be registered.

[Principal Object Detection Processing]

Figure 8:
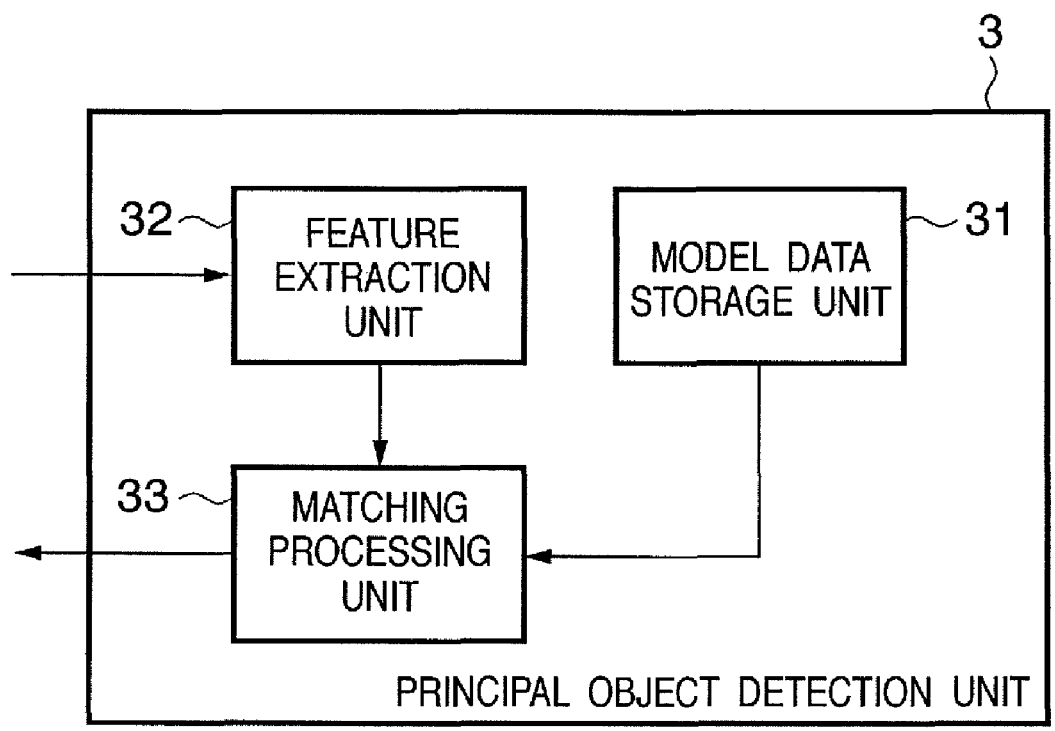
FIG. 8 is a block diagram showing the functional configuration of a principal object detection unit.

The detection processing executed in step S2 by the principal object detection unit 3 will be explained in detail with reference to FIG. 8. FIG. 8 is a block diagram showing the functional configuration of the principal object detection unit 3.

The principal object detection unit 3 extracts a geometric feature or another feature (e.g., color or motion vector information) at each point (sampling point) in input image data. The principal object detection unit 3 executes matching with model data, template matching, or the like on the basis of the feature quantity, and detects an object in a set category. The principal object detection unit 3 outputs the position of the detected target in the input image.

As shown in FIG. 8, main building components of the principal object detection unit 3 are a model data storage unit 31, feature extraction unit 32, and matching processing unit 33. The model data storage unit 31 stores in advance, as model data for each category, image information corresponding to a category containing an object to be detected. The feature extraction unit 32 performs the above-mentioned feature quantity extraction at a predetermined sampling point position. The matching processing unit 33 performs matching processing (similarity calculation) between input image data and model data on the basis of the extracted feature quantity.

Processing executed by the matching processing unit 33 is the same as that executed by, e.g., an image information extraction apparatus described in Japanese Patent Laid-Open No. 9-130714. That is, a template model image of a size corresponding to the object distance is generated, and the normalized correlation coefficient or the like is calculated at each point while the frame is scanned using the template model image. Then, the similarity distribution between local portions of an input image and model data is calculated. In general, if the maximum value of the similarity distribution exceeds a predetermined threshold, a pattern belonging to the category is detected.

As pre-processing, the primary feature quantity (low-order feature quantity such as a motion vector or color information) may be extracted in advance by a known method from time-series input image data. A candidate area where a principal object highly likely exists is extracted to narrow down the search range. This can shorten the time taken to detect a principal object. For example, image areas having a color close to the pre-registered color (e.g., the skin color of a person) of the main part of model image data are extracted by threshold processing. Alternatively, (from these image areas,) an area having a given motion vector quantity at a predetermined size or more is extracted as an object candidate area. After that, the above-mentioned similarity calculation is done at only sampling points within the candidate area.

Assume that (the imaging optics 1 of) the image capturing apparatus is fixed and installed at a predetermined position. When the image capturing apparatus is held in the hand to take a picture, a global motion vector quantity (Ego-motion vector) accompanied by the motion of the image capturing apparatus itself is extracted and canceled from the total motion vector distribution, and then area segmentation is executed on the basis of the resultant motion vector quantity. With this procedure, the candidate area of a moving object such as a person can be obtained.

The primary feature quantity extracted for pre-processing need not be limited to a feature quantity obtained from chromatic information or motion vector information, and another low-order feature quantity may also be used. Examples of the low-order feature quantity are a geometric feature having the directional component of a specific range and the spatial frequency of the specific range, and a local feature element disclosed in Japanese Patent No. 3078166. In this case, the ratio of the threshold to a calculated maximum similarity is used as reliability, but another index (e.g., the variance value of a maximum similarity calculated in a predetermined time width) may also be used as reliability.

Note that the matching processing unit 33 is not limited to the above configuration. For example, the matching processing unit 33 may be implemented by a hierarchical neural network circuit (Japanese Patent Application Nos. 2000-181487, 2000-181488, and 2000-181480), or another configuration. In any case, the matching processing unit 33 outputs the detection reliability (or certainty factor) of an object detected as a principal object and position information in the frame. If no principal object is detected in the frame, the matching processing unit 33 may output a principal object absence detection signal.

[Processing of State Change Estimation Unit 4]

The contents of processing executed by the state change estimation unit 4 in steps S3 and S4 will be explained. Assume that the face of a principal object has already been detected, and feature points or feature quantities (e.g., a position, relative position vector or distance, or edge density near a target portion) at portions (e.g., the corners of the eyes and the corners of mouth of the face) effective to detect a facial expression have already been detected.

Figure 7:
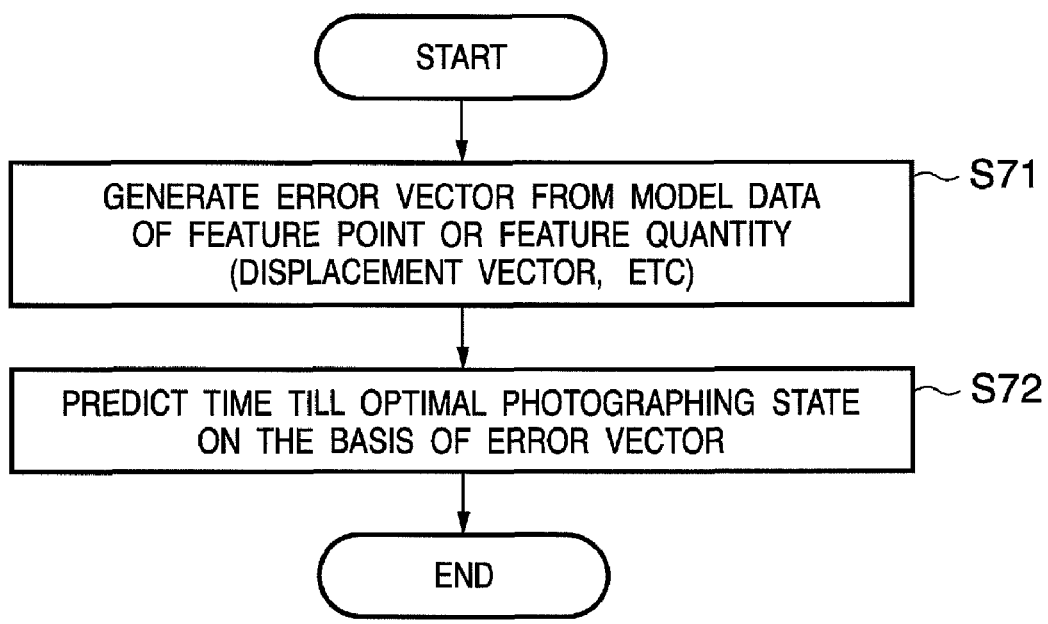
FIG. 7 is a flowchart showing the flow of processing on prediction of an optimal photographing state.

The state change estimation unit 4 performs processing associated with prediction of an optimal photographing state on the basis of the change amount of several past frames at these feature points as a temporal-spatial pattern sequence, or a feature quantity vector sequence and a feature quantity distribution extracted from a face image in the current frame. FIG. 7 is a flowchart showing the flow of processing on prediction of an optimal photographing state. This processing is executed after a detected face image is normalized to a predetermined size.

The state change estimation unit 4 performs processing on prediction of an optimal photographing state as shown in the flowchart of FIG. 7, and estimates the time when the facial expression changes closest to registered data (model data) on a predetermined facial expression stored in advance in the model data memory 6.

In step S71, the state change estimation unit 4 extracts m feature quantities (including the distributions of motion and displacement vectors, the distance between feature points such as the distance between the end points of the eye corners and mouth, and a change of the edge density) at effective portions as feature quantities of facial expression detection.

The state change estimation unit 4 extracts time-series vectors (error vectors) containing, as elements, errors between time-series data of m feature quantities in each of several frames from the past to the present, and time-series data of corresponding feature quantities of a facial expression registered as model data. Assume that each feature point position is given by a position vector using as a reference the tip position of the nose or the midpoint position (to be referred to as a face reference point hereinafter) of a line segment which links the centers of the two eyes. Each feature point position may also be expressed by another notation. Major feature points used for facial expression recognition are, e.g., a mole, the corner of the eye, the tip of the eye, the corner of the mouth, the end point of the eyebrow, the inflection point of the contour of the eyebrow, the nostril, and the inflection point, branch point, and end point of the contour of wrinkles.

In step S72, the state change estimation unit 4 estimates the time until the facial expression reaches a specific one (e.g., smile), on the basis of time-series data of the motion (displacement) vector distribution at corresponding points from a predetermined frame image (e.g., expressionless face) at feature points set in the plane of a person's face. More specifically, the state change estimation unit 4 estimates the time when the error vector sequence converges to the zero vector or the norm of the error vector converges to a predetermined magnitude (step S72). Note that the error vector may be generated on the basis of the difference from model data not for all the elements of associated feature quantities but for the elements of some effective specific elements.

The time is estimated on the basis of transition of the error vector value up to the present before a predetermined time. For example, when the norm value of the error vector is 5 before two unit times, 4 before one unit time, and 3 at the present, it can be predicted that the norm value is decremented by one upon the lapse of one unit time. Hence, it is predicted that the norm value becomes 0 after two unit times, i.e., the facial expression reaches a specific one. As will be described later, the prediction algorithm is a well-known one.

In calculating the magnitude of the error vector when the error vector is generated on the basis of some elements of associated feature quantities, each element of the vector is given a predetermined weight to calculate a norm (e.g., Euclidian norm or Minkowski norm) by a predetermined scale. It is most common to adopt the Euclidian norm at a uniform weight. When, however, a specific element (for example, for smile detection, the distance between the end points of the corners of the eyes and mouth) is important for detection depending on a category subjected to detection, the weight value is increased in accordance with the importance.

For example, when a desired smile is to be detected, as described above, the image capturing apparatus according to the first embodiment registers the image of the desired smile in step S0 in advance on the basis of an instruction input from the user, or selects the image of a preset smile. The image capturing apparatus according to the first embodiment analyzes the image to extract feature points, calculates model data on the basis of the extracted feature points, and stores the model data in the model data memory 6.

In processing step S71, feature points corresponding to the feature points used to calculate model data are selected. For example, the positions of the right and left mouth corners of the smile and those of the right and left eye corners are selected as feature points. The error vector (based on the above definition) generated on the basis of the displacement (model data) of these feature point positions and the displacement of corresponding feature point positions (positions relative to the reference point of the face) on the input image is calculated for respective frames, i.e., frames at time t=n, n−1, n−2, . . . .

More specifically, model data of a displacement vector (motion vector) at each feature point (or near each feature point) is stored in advance in the model data memory 6 referred to by the state change estimation unit 4 in accordance with the detection category. The error vector is generated by giving a predetermined weight to each element of the difference vector between a displacement vector read out from the model data memory 6 and a corresponding displacement vector extracted from an input image. Each weight value is generally constant, but when the displacement at a specific portion or the displacement between portions is important, may be set to a relatively high value.

The frame time (to be referred to as best facial expression time hereinafter) when the obtained error vector becomes the zero vector or its magnitude decreases to a predetermined value or less is predicted in processing step S72. For example, the time when the value of the magnitude of an error vector obtained for each input image frame from time-series data becomes 0 or equal to or smaller than a reference value is attained using linear prediction (so-called AR(Auto-Regressive), ARMA(Auto-Regressive Moving Average), ARX (Auto-Regressive exogenous), or the like), non-linear prediction based on modeling, or the like. Non-linear prediction based on modeling includes a method of setting up a model motion equation for an observation data sequence and making prediction on the basis of the model motion equation, or a method using a neural network.

As predetermined local feature quantities, in addition to the error vector, edge densities or power spectra at feature points showing changes unique to a facial expression to be detected, e.g., in local areas near the eyes and mouth, and displacement vectors at feature point positions such as the corners and tips of the eyes may be adopted as time-series data. In this case, the time until the facial expression reaches or converges to a desired one is predicted from the deviation distribution between feature quantity data at each time and corresponding feature quantity data of an expressionless face.

More specifically, the following processing is done when a smile is to be detected and the trend (for example, the positions of the end points of the mouth move sideways) of a change at specific feature point positions is held as data unique to the smile. In this case, the distribution of the change rate of a displacement vector from the expressionless state at each feature point toward a change unique to the facial expression (in a direction toward a predetermined facial expression category) is obtained for each input image data. The time when the value becomes equal to or smaller than a threshold (the facial expression converges to a specific one) is predicted as the best facial expression time.

The best facial expression time (image input timing) may also be set on the basis of a representative magnitude (e.g., the distance between the end points of the corners of the eye and mouth) of a displacement vector at limited specific portions, instead of obtaining the distribution of displacement vectors at many points on the plane of a person's face. This can reduce the calculation amount and enhance high-speed responsiveness without greatly decreasing the estimation precision.

The time when the temporal change rate of the displacement vector becomes equal to or lower than a threshold is predicted in order to, when the target facial expression is a smile, predict not the progress during which the facial expression changes from a smile to a laugh with his mouth open, but the time when the facial expression converges to the best one when the object laughs with his mouth open. However, a model image corresponding to a specific intermediate facial expression during transition to a specific facial expression can also be set as the best facial expression. In this case, the positional deviation from model data at each feature point position extracted in the above-described manner may be referred to. When this deviation is used, the size of the face or the like is normalized in advance.

The photographing mode to be selected by the user may further include a group photograph/souvenir photograph mode. Particularly in this mode, the photographing time (image input timing) must be so controlled as to satisfy requirements on several facial expressions such that a plurality of objects open their eyes (do not close their eyes), close their mouths (or smile), and face the front.

Figure 10:
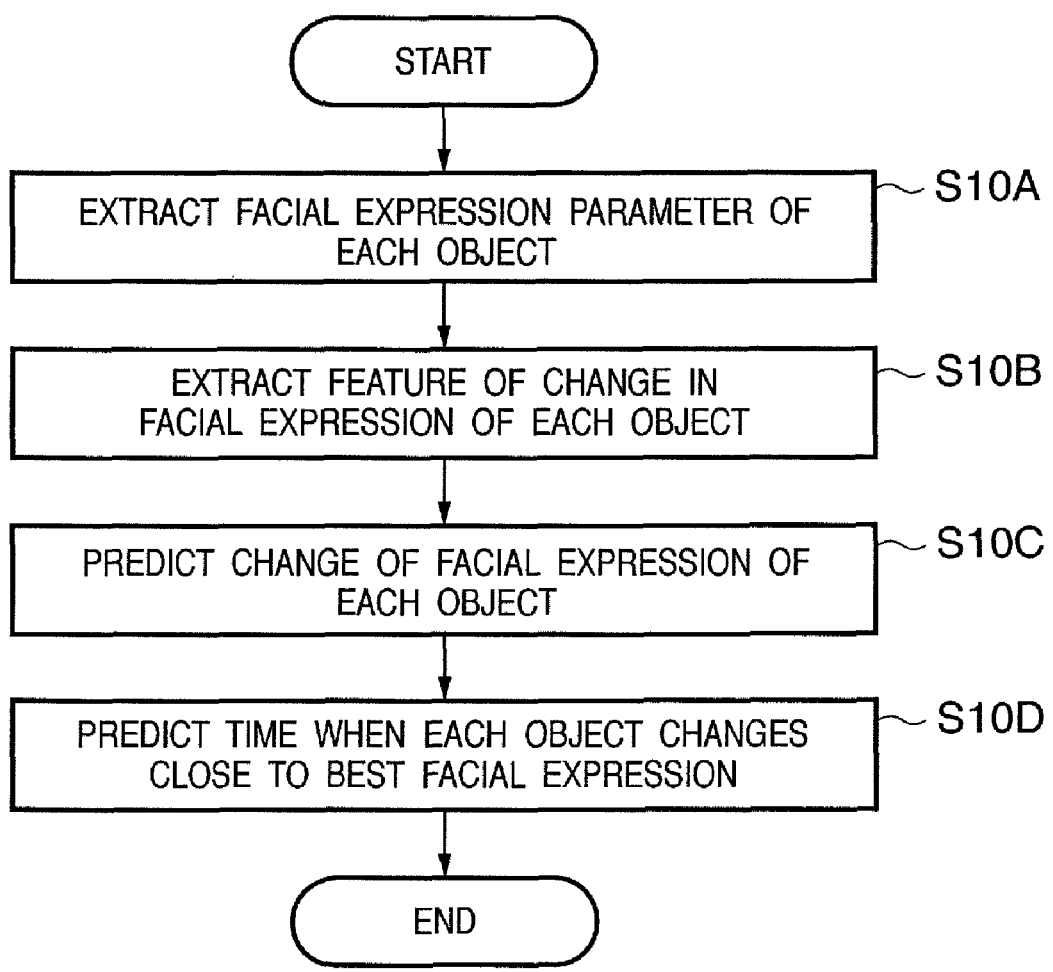
FIG. 10 is a flowchart showing the flow of processing by a state change estimation unit when a group photograph mode is selected.

Processing by the state change estimation unit 4 when the group photograph mode is selected will be explained with reference to FIG. 10. FIG. 10 is a flowchart showing the flow of processing by the state change estimation unit 4 when the group photograph mode is selected.

In step S10A, the facial expression parameters of each object (person) are extracted. More specifically, positions (or distances between feature points) such as the end points of the corners and tips of the eyes and the end points of the mouth, or motion vectors at respective points are extracted.

In step S10B, the feature of a change of a facial expression is extracted, and feature quantities associated with the trend of changes of the facial expression parameters are extracted. More specifically, a change of the eye opening, a change of the mouth opening, a change of the face orientation, and the like are detected.

In steps S10C and S10D, the time when objects change close to the best facial expression corresponding to the image capturing mode (group photograph mode) as a whole is predicted similarly to the processing shown in FIG. 7. At this time, it is difficult to predict the time when all the objects change to the best state. For this reason, the following processing may be done. That is, in step S10C, a change of the facial expression change feature quantity extracted from each object is approximately predicted. In step S10D, the best facial expression time is estimated by processing as shown in FIG. 7. The best facial expression is defined in advance on the basis of conditions that the object opens his eyes, smiles, and faces the front.

Prediction is not limited to the group photograph mode, and the state change estimation unit 4 may predict a blink (state in which an object closes his eyes) during a time period of several frames before and after the best facial expression, and predict the timing (to be referred to as a non-blink time period hereinafter) when the object does not close his eyes. In this case, an image is input at a predicted timing when the best facial expression falls within the non-blink time period. If it is predicted that the eyes will be closed at the best facial expression time, an image which falls within the non-blink time period and belongs to a facial expression category to be detected is input, and a time predicted to be closest to the best facial expression time is obtained as the best photographing state time.

[Timing Control]

Figure 5:
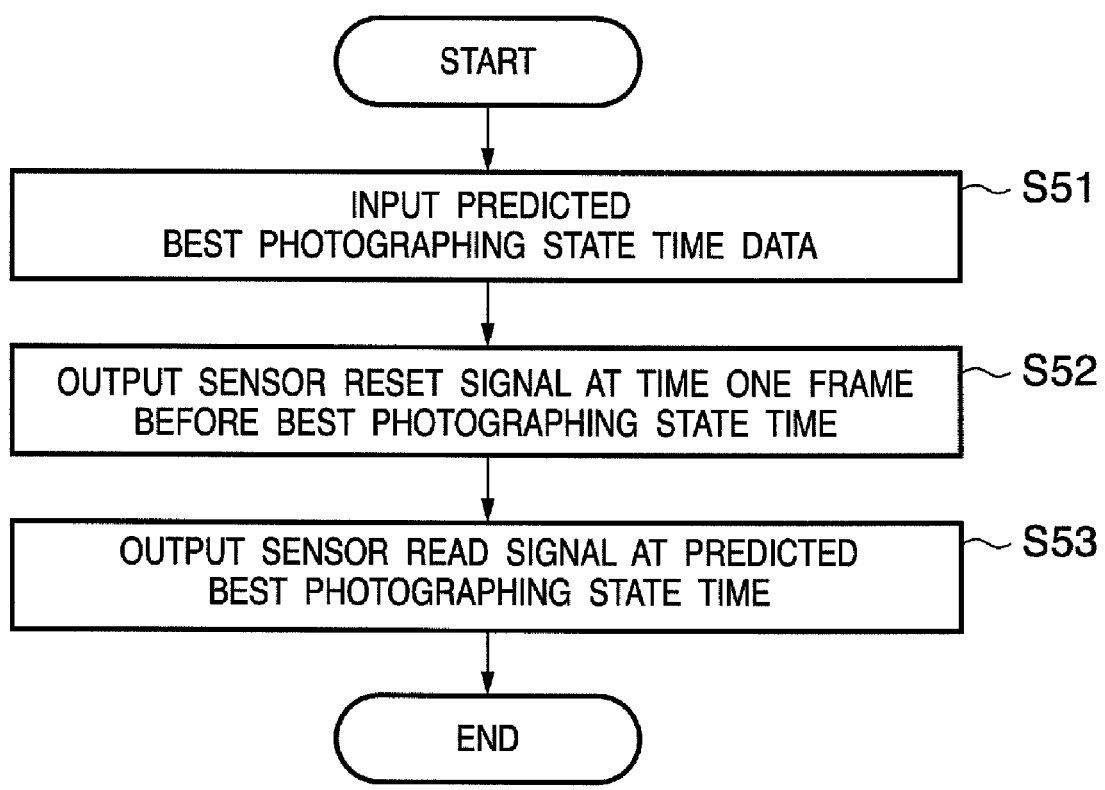
FIG. 5 is a flowchart showing the flow of timing control processing.

Control executed in step S5 for the timing of data read from the video sensor of the video input unit 2 will be explained with reference to FIG. 5. FIG. 5 is a flowchart showing the flow of the timing control processing.

When the time interval between frames is T msec, the state change estimation unit 4 estimates the time (best facial expression time) when an optimal facial expression is obtained from error vector data attained at discrete image input times (to be referred to as a frame time hereinafter) of every T msec. The obtained best facial expression time does not always coincide with a frame time, and often takes an intermediate analog value between discrete frame times. Thus, the image input processing control unit 7 executes the following processing.

In step S51, the image input processing control unit 7 receives a predicted best photographing state time from the state change estimation unit 4.

In step S52, the image input processing control unit 7 sends, to the video sensor of the video input unit 2, a signal for resetting the read timing once one frame before the predicted time.

In step S53, the image input processing control unit 7 outputs a read timing pulse signal to the video sensor of the video input unit 2, and controls the read timing from the photodetector of the CMOS image sensor so as to record a corresponding image at the predicted time. Under this control, image data is read out at the estimated time. Note that an image at a frame time closest to the estimated time may be input.

An expected effect can also be obtained by inputting images at a predetermined rate and predicting a frame closest to an optimal facial expression without executing the above-described control of the read timing from the sensor.

In addition to the above configuration, the image capturing apparatus may include a signal processing circuit (not shown) for controlling an exposure amount control parameter, white balance control parameter, other image capturing parameters, and include a functional element for controlling image capturing conditions. The functional element may predict, on the basis of a motion vector distribution model and a motion vector distribution extracted from an input image, the timing when an object changes closest to a target category, and may set the image input timing.

As described above, according to the present embodiment, changes of the figure and action of a principal object, changes of photographing conditions, and the like are predicted. Image capturing conditions such as an optimal timing, exposure, and focus which meet conditions set in advance are set on the basis of the prediction results. As a result, a picture can be autonomously taken without missing any photo opportunity.

Second Embodiment

The first embodiment has described the configuration in which the timing when a target to be captured satisfies a predetermined condition is estimated and image data corresponding to the estimated timing is stored and controlled. However, the estimation target is not limited to the image capturing timing. The second embodiment will describe a configuration in which photographing conditions such as the exposure and focus at a timing suitable for image capturing are estimated and an image is captured under the image capturing conditions.

Figure 2:
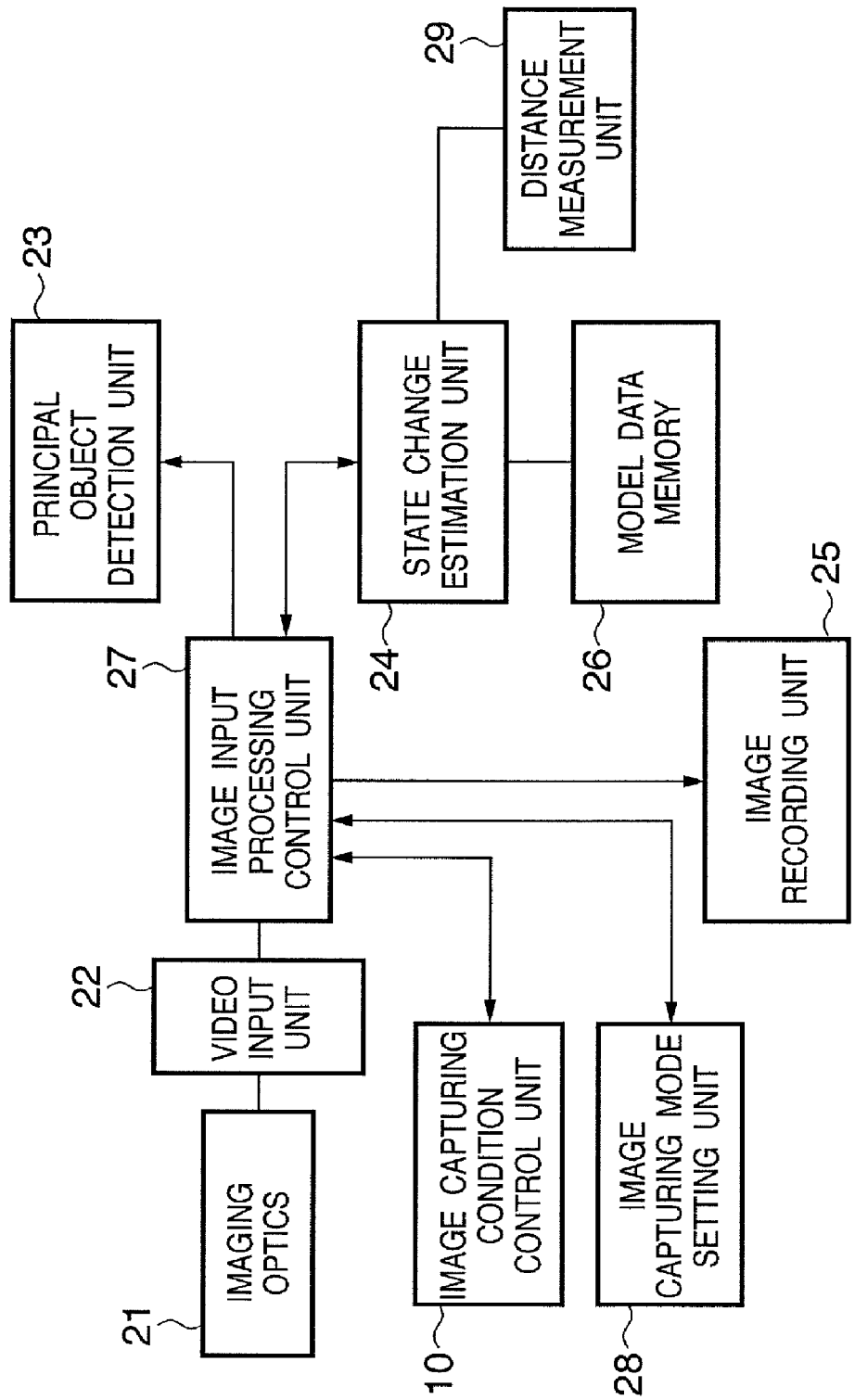
FIG. 2 is a block diagram showing the configuration of the main part of an image capturing apparatus according to the second embodiment.

FIG. 2 is a block diagram showing the configuration of the main part of an image capturing apparatus according to the second embodiment. The configuration according to the second embodiment comprises an image capturing condition control unit 10 which controls photographing conditions such as the exposure and focus, and a distance measurement unit 29 which measures the distance between an object and the image capturing apparatus, in addition to the configuration of the first embodiment. The remaining main building units, i.e., an imaging optics 21, video input unit 22, principal object detection unit 23, state change estimation unit 24, image recording unit 25, model data memory 26, image input processing control unit 27, and image capturing mode setting unit 28 are the same as those in the first embodiment, i.e., they correspond to the units 1 to 8 in FIG. 1. Similar to the first embodiment, the image input unit 22 includes a video sensor, sensor signal processing circuit, and sensor driving circuit.

The image capturing condition control unit 10 controls photographing conditions such as the exposure and focus on the basis of a prediction signal input from the state change estimation unit 24. For example, when an object moves quickly apart from the image capturing apparatus, a general AF (Automatic Focus) device cannot track or control an accurate in-focus state. To solve this problem, the (autonomous) image capturing apparatus according to the second embodiment incorporates a predetermined distance measurement unit 29 which measures the distance between an object and the image capturing apparatus. The state change estimation unit 24 generates a prediction signal associated with the object distance on the basis of a signal which is output from the distance measurement unit 29 and associated with the distance to the object. In accordance with the prediction signal, the image capturing condition control unit 10 performs positioning control of a focus control lens motor. In this case, the state change estimation unit 24 adopts a result of measuring mainly the focus state of a detected object area.

Figure 4:
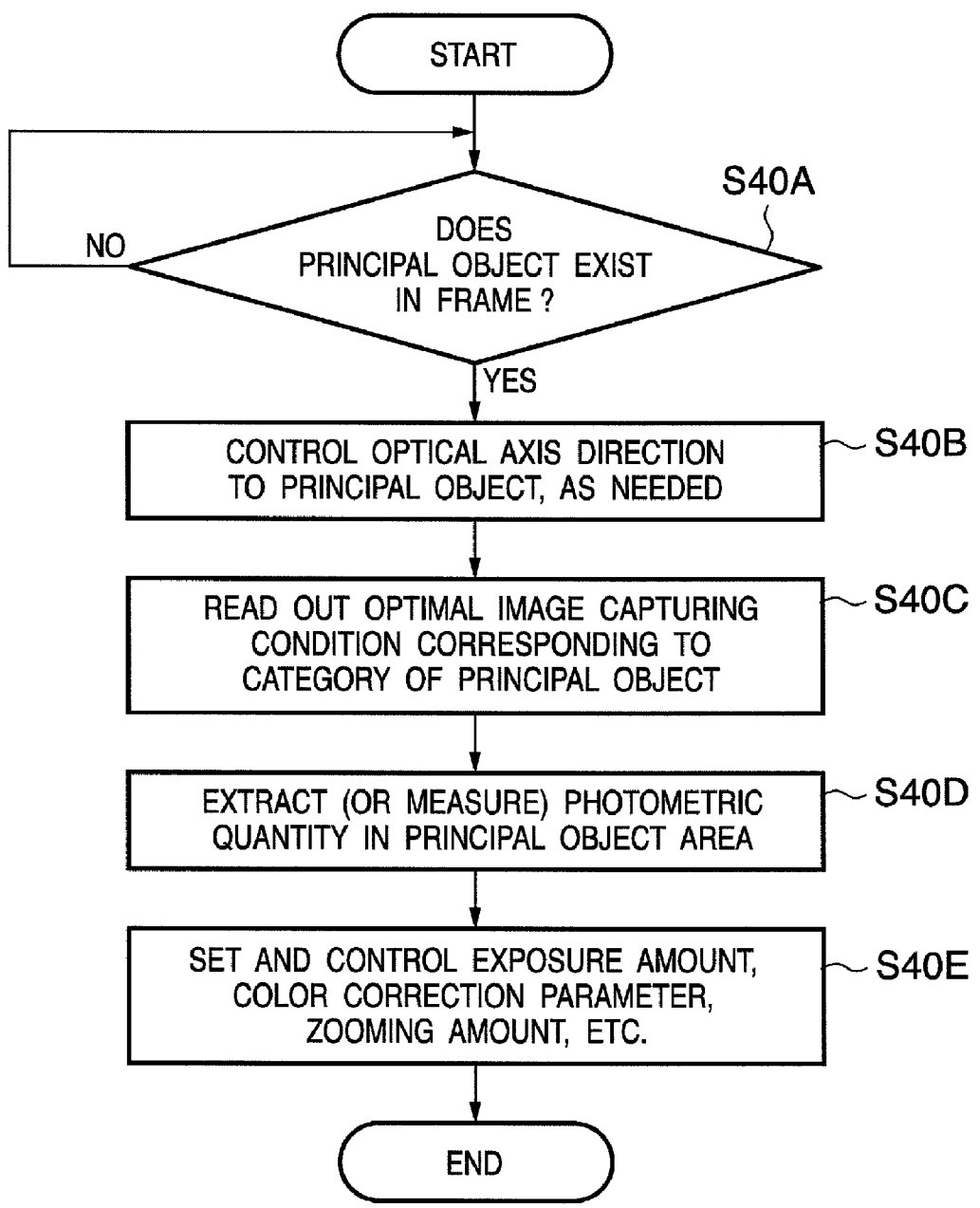
FIG. 4 is a flowchart showing the flow of processing in an image capturing condition control unit.

The flow of processing in the image capturing condition control unit 10 will be explained with reference to FIG. 4. FIG. 4 is a flowchart showing the flow of processing in the image capturing condition control unit 10.

In step S40A, principal object presence information is input from the principal object detection unit 23 to determine whether a person serving as a principal object exists in the frame. If the principal object exists (YES in step S40A), the flow advances to step S40B; if no principal object exists (NO in step S40A), the processing in step S40A is performed again upon the lapse of a predetermined time.

In step S40B, it is determined whether the object is positioned at the center of the frame. If the object is not positioned at the center, the optical axis is controlled and set so as to position the principal object at the center of the frame. Note that the image capturing apparatus according to the second embodiment comprises a driving mechanism (not shown) capable of freely setting the image capturing direction. The processing in step S40B is executed on the basis of the operation of the driving mechanism.

In step S40C, optimal image capturing conditions (e.g., the exposure condition, white balance, focus, and face size which give a predetermined color component value to the skin color component area) corresponding to a photographing mode (e.g., portrait mode) are read out from the model data memory 26.

This processing will be explained by exemplifying a case wherein focus control (predictive focus control) is performed. In order to execute the predictive focus control, data of a focus control lens position corresponding to an object distance is stored as a lookup table in advance in the model data memory 26. In the predictive focus control processing, the state change estimation unit 24 refers to the model data memory 26, and linearly predicts an object distance in the next frame and a corresponding optimal lens position from time-series data associated with the object distance. The image capturing condition control unit 10 generates a lens motor driving control signal for corresponding focus control. In this manner, a change of the focus state (corresponding lens position for optimal focus control) is predicted from the lookup table using distance information on a principal object on the basis of a signal from the distance measurement unit 29. As a result, focus control can be tracked and achieved at high speed.

This also applies to the parameters of other image capturing conditions. For example, as for predictive exposure control, if the principal object is a specific person, an exposure amount and color correction processing parameter suitable for the person are read out from the image capturing control parameter storage unit.

In step S40D, change data of the photometric quantity in the person area are detected in time series.

In step S40E, corresponding optimal photographing conditions (e.g., the exposure amount, zooming, and focus) are controlled. The exposure amount suitable for the specific person is one set upon adjusting the white balance so as to obtain a predetermined skin color suited to the person under a given illumination condition.

More specifically, similar to prediction of the image input timing, the state change estimation unit 24 linearly or non-linearly predicts the photometric quantity in the next frame or after a predetermined time on the basis of time-series data of the average photometric quantity of the principal object area. The image capturing condition control unit 10 determines exposure control parameters (e.g., the accumulation time in the sensor, and the read timing) from the predicted photometric quantity by looking up data of a lookup table stored in advance in a predetermined memory. Then, the image capturing condition control unit 10 controls the exposure in the next frame or after the predetermined time. Data of the lookup table takes a table form which records photometric quantity data and corresponding control parameter values (e.g., parameter values associated with the accumulation time in the sensor and the read interval from the sensor).

In step S40E, in order to execute predictive control so that the size of the principal object in the frame falls within a predetermined range, the zooming amount is controlled to sense the object at a size within the range. When the principal object, is a person's face, the size of the face is not so different between individuals. Letting d be the distance from the person to the image capturing unit, f be the focal length, S be the size of the face (principal object), and s be the size of the face (principal object) captured in the frame, the relation:

$$s=(f/d-f)\cdot S$$

is established (d>f).

In order to keep the size of the principal object constant, the following processing is executed. That is, d is estimated from a distance signal (signal corresponding to the distance to the principal object in a predetermined distance measurement area) obtained from a distance detection unit in an AF control circuit (not shown) incorporated in the image input processing control unit 27. The focal length f is controlled so that the principal object size s in the frame is held within a predetermined range. When distance measurement areas are set at a plurality of portions within the frame, a distance signal may be obtained only in a distance measurement area at the position where a principal object was detected.

Note that predictive zooming control may be executed as follows. More specifically, the time is predicted when the size s of a principal object within the frame becomes larger than the frame size or becomes equal to or smaller than a predetermined size. Before the current time reaches the predicted time, the magnification is controlled to decrease in the former case (when the size s becomes larger than the frame size) or increase in the latter case (when the size s becomes equal to or smaller than the predetermined size). At this time, a controlled variable P of the magnification may be obtained on the basis of an arrival time $T_1$ till the predicted time and a change rate R of the size of the principal object within the frame. For example, the controlled variable P is obtained by $P=C_1/\{(1+C_2T_1)R\}$ ($C_1$ and $C_2$ are positive constants).

As simple estimation of the principal object area, for example, only the center position of the face area of a person may be detected by the principal object detection unit 23, and the area may be estimated from the size s calculated on the basis of the above equation. Photometry information of the area may be obtained by a well-known method (e.g., a method disclosed in Japanese Patent Laid-Open No. 08-278528) to control the exposure or the like on the basis of the result.

In the second embodiment, the state change estimation unit 24 predicts at least one of parameters of a principal object at the image input timing a predetermined time after the current image input time, or after a predetermined frame. These parameters Include, e.g., the position of a principal object within the frame, the shape or size, the representative luminance value, the representative contrast, and the hue and brightness distributions. The image capturing condition control unit 10 uses at least one predicted parameter value to control at least one of the conditions of the optical axis direction, magnification, focal position, and exposure amount of the imaging optics 21.

As a control rule set in advance for each parameter, for example, the optical axis direction (image capturing direction) is controlled to always locate a principal object near the center of the frame. As another parameter, for example, the magnification is controlled to keep the principal object size within a predetermined range (based on the reference of the total size ratio of an image). For example, the focus is controlled to always keep the focusing degree of a principal object near the maximum (or the local maximum). For example, the exposure amount is controlled to keep the average luminance value of the main part of a principal object within a predetermined range.

A parameter selected to be predicted is one whose change rate or variation (or variance value as time-series data) is larger than a reference value set for each parameter. Assume that an image capturing condition to be controlled is defined for each parameter to be predicted. For example, when the position of a principal object is predicted, the focal position is controlled (magnification may also be controlled) for the optical axis direction and size, and the exposure amount is controlled for the representative luminance value or representative contrast.

By controlling image capturing conditions on the basis of prediction by the state change estimation unit 24 according to the second embodiment, an image capturing operation with high tracking performance to a change of the object state can be implemented even if not only the principal object position (distance) but also the illumination condition abruptly change.

As described above, the configuration according to the second embodiment comprises the image capturing condition control unit 10 and the distance measurement unit 29, in addition to the configuration of the first embodiment. Parameters associated with a captured image of an object are predicted, and image capturing conditions are controlled on the basis of the predicted parameters. With the configuration according to the second embodiment, an appropriate image capturing operation can be done in response to complicated environmental changes.

Third Embodiment

In the third embodiment, in addition to the above configuration, image capturing conditions are automatically controlled (changed) on the basis of the result of detecting the motion pattern of a principal object (person) (the contents of the motion pattern).

Figure 6:
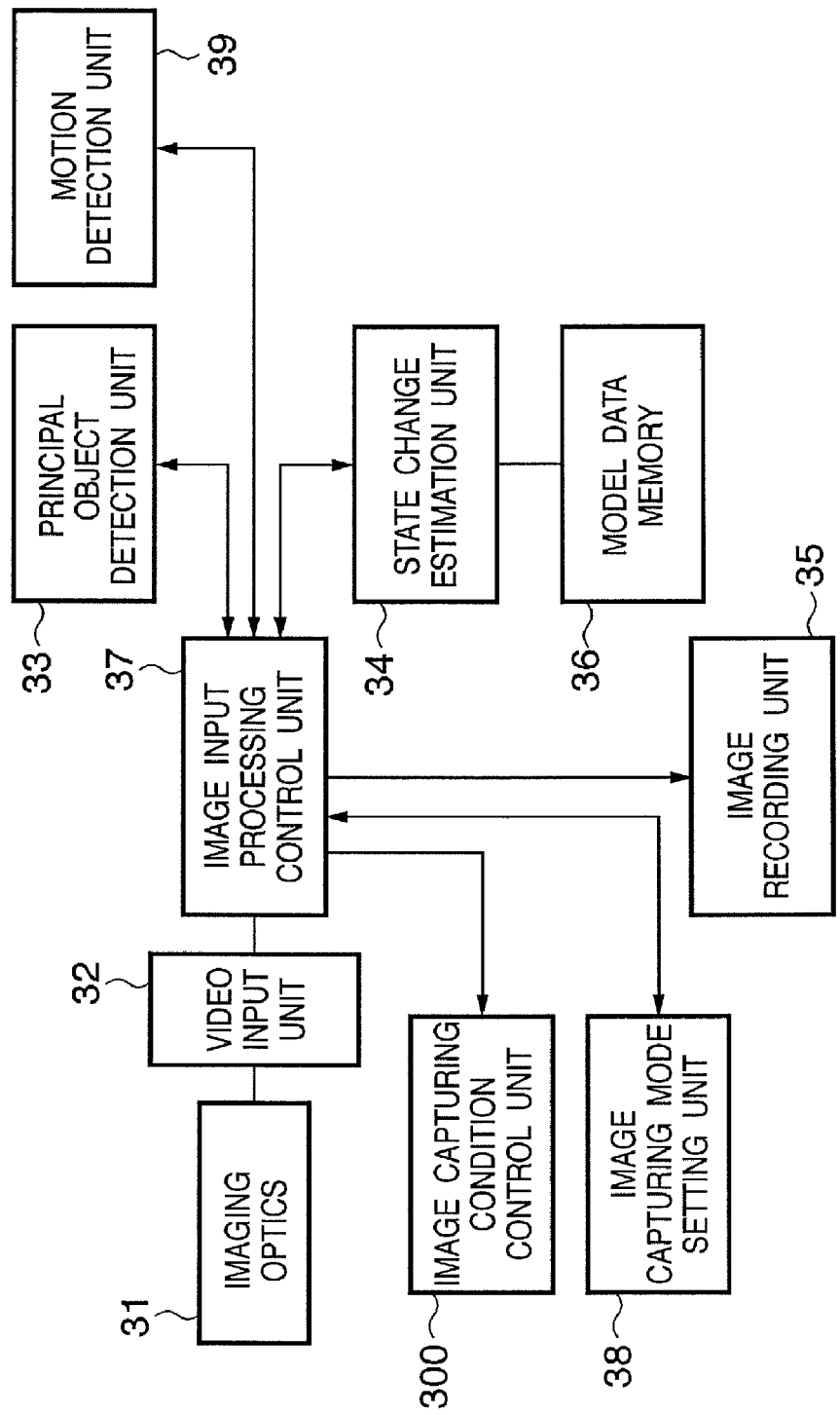
FIG. 6 is a block diagram showing the configuration of the main part of an image capturing apparatus according to the third embodiment.

FIG. 6 is a block diagram showing the configuration of the main part of an image capturing apparatus according to the third embodiment. As shown in FIG. 6, the image capturing apparatus according to the third embodiment comprises an imaging optics 31, video input unit 32, principal object detection unit 33, state change estimation unit 34, image recording unit 35, model data memory 36, image input processing control unit 37, image capturing mode setting unit 38, and image capturing condition control unit 300. These units are the same as the units 1 to 8 in FIG. 1 and the unit 10 in FIG. 2, and a detailed description thereof will be omitted.

In addition to the above configuration, the image capturing apparatus according to the third embodiment further comprises a motion detection unit 39 for a principal object. When the motion detection unit 39 detects a predetermined motion of a principal object, the image input processing control unit 37 and image capturing condition control unit 300 execute a change of the image input rate, zooming to the principal object, exposure centered on the principal object, setting of the focus condition, and the like. A change of the image input rate is to increase or decrease the image rate from a normal one used when the motion detection unit 39 does not detect any motion. Composite control of the zooming, focus, and exposure condition is the same as the processing in the second embodiment, and a description thereof will be omitted.

The purpose of changing the image input rate is to capture and record in detail the contents of a specific significant (important) motion. When the image input rate is set high (low), the read rate of a photoelectrical conversion signal from the sensor is set high (low). In general, when the read rate is set high, the amplification factor for a signal output from the sensor and amplified by the amplifier is controlled to increase.

A motion detected by the motion detection unit 39 is a body motion of a principal object when the principal object is a person or animal. The body motion is a specific motion pattern in a given sport (e.g., a motion when the principal object makes a swing at golf, tennis, or baseball), specific postures in dancing, a gesture or hand signal with a specific meaning, of the motion of the whole body or head of a runner. When the principal object is a vehicle such as a car, two-wheeled vehicle, or train, an abnormal state in the stream of vehicles is detected and corresponds to an accident such as a crash, collision, roll-over, or half roll. When the principal object is a vehicle, like the latter case, and an accidental state is detected, the image input rate is increased, or a motion mode in which no input image is recorded on a medium normally (when no accidental state is detected) is set. With this setting, moving images are recorded during a predetermined time before and after an accidental state is detected.

Recognition processing for detecting a typical motion of a person uses a known technique. For example, a swing motion using a tool such as a racket or bat, like a ball game, is detected as follows. More specifically, the orientation of a person's face, the position of his wrist (or palm or fingers), and the position and posture of a tool are detected. It is detected that these feature points change following a track within a predetermined range while keeping a preset relative positional relationship in an image viewed from a predetermined viewpoint position.

For example, to detect a swing motion of tennis, the center of gravity on the racket surface, the position of the grip, that of the wrist, that of the head, those of the knees and ankles of the legs of the body, and the like are set as feature points of motion detection. A state in which the wrist position is near the grip of the racket and the wrist moves widely within the horizontal plane is detected as a swing motion.

For this purpose, the motion detection unit 39 comprises a head detection unit (not shown), face position/orientation detection unit (not shown), wrist (or palm or finger) detection unit (not shown), tool position/orientation detection unit (not shown), and motion category determination unit (not shown). Instead of these units, an object detection/recognition unit which is compatible with multiple categories and comprises a function of detecting a head, face, hand, and tool may be employed as a main building component.

Figure 11:
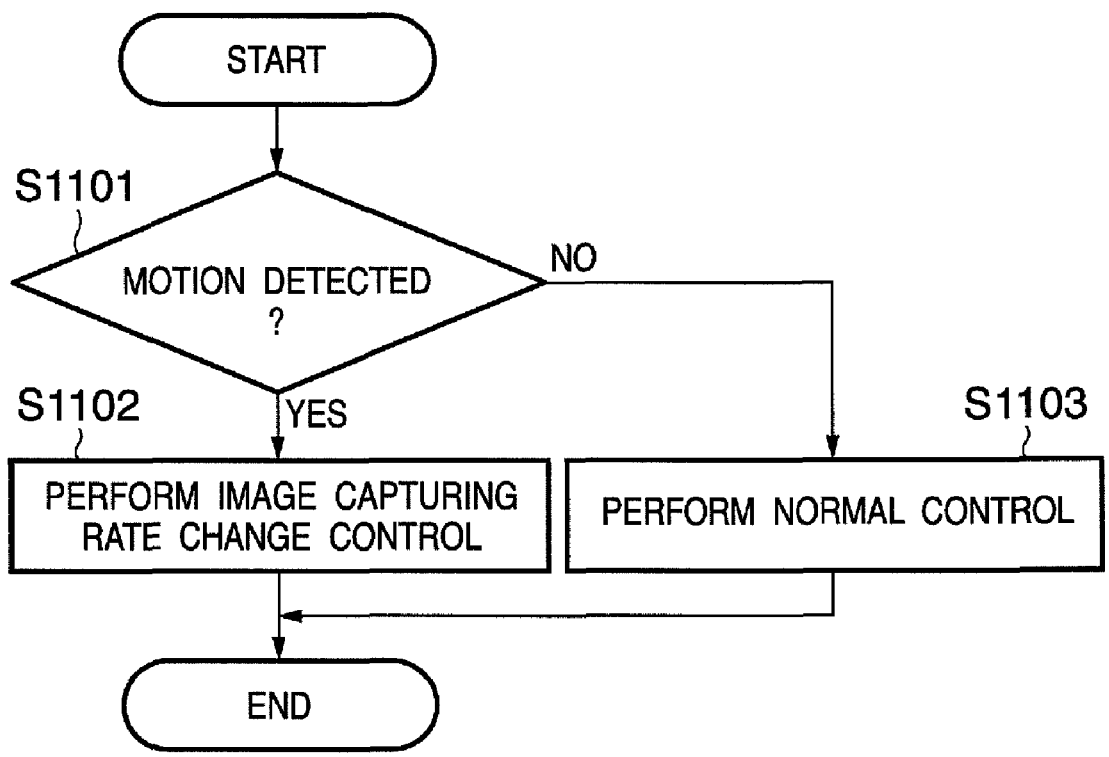
FIG. 11 is a flowchart showing the flow of processing executed by a motion detection unit.

The flow of the above-described processing will be explained with reference to FIG. 11. FIG. 11 is a flowchart showing the flow of the processing executed by the motion detection unit 39 according to the third embodiment.

The processing in FIG. 11 is executed after step S3 in FIG. 3 (e.g., between steps S3 and S4). In step S1101, whether the motion of a principal object is detected is determined on the basis of, e.g., a principal object state extracted in step S3. If the motion is detected (YES in step S1101), the flow advances to step S1102; if no motion is detected (NO in step S1101), to step S 1103.

In step S1102, processing to increase the image capturing rate in accordance with the object motion is performed. Then, the flow in FIG. 11 ends. In step S1103, normal image capturing control is performed. Then, the flow in FIG. 11 ends. As described above, the configuration according to the third embodiment incorporates the processing circuit (motion detection unit 39) which detects and recognizes a person or vehicle, and also detects a specific motion or state. When the specific motion or state is detected, the image input rate is controlled to increase. This can implement photographing which does not miss any chance to capture the image of an important scene.

Fourth Embodiment

Figure 12:
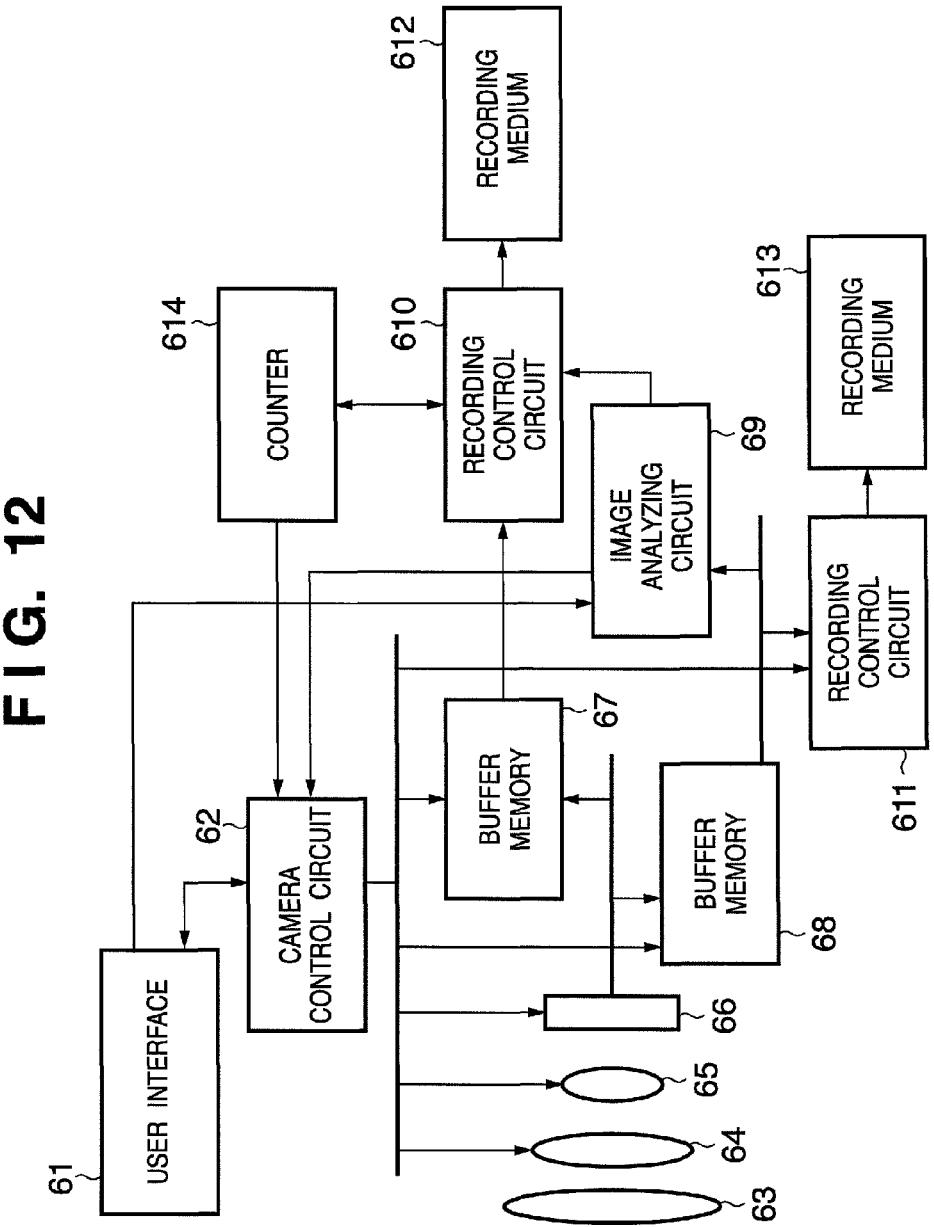
FIG. 12 is a block diagram illustrating the configuration of an image capturing apparatus according to the fourth embodiment of the present invention.
Figure 13:
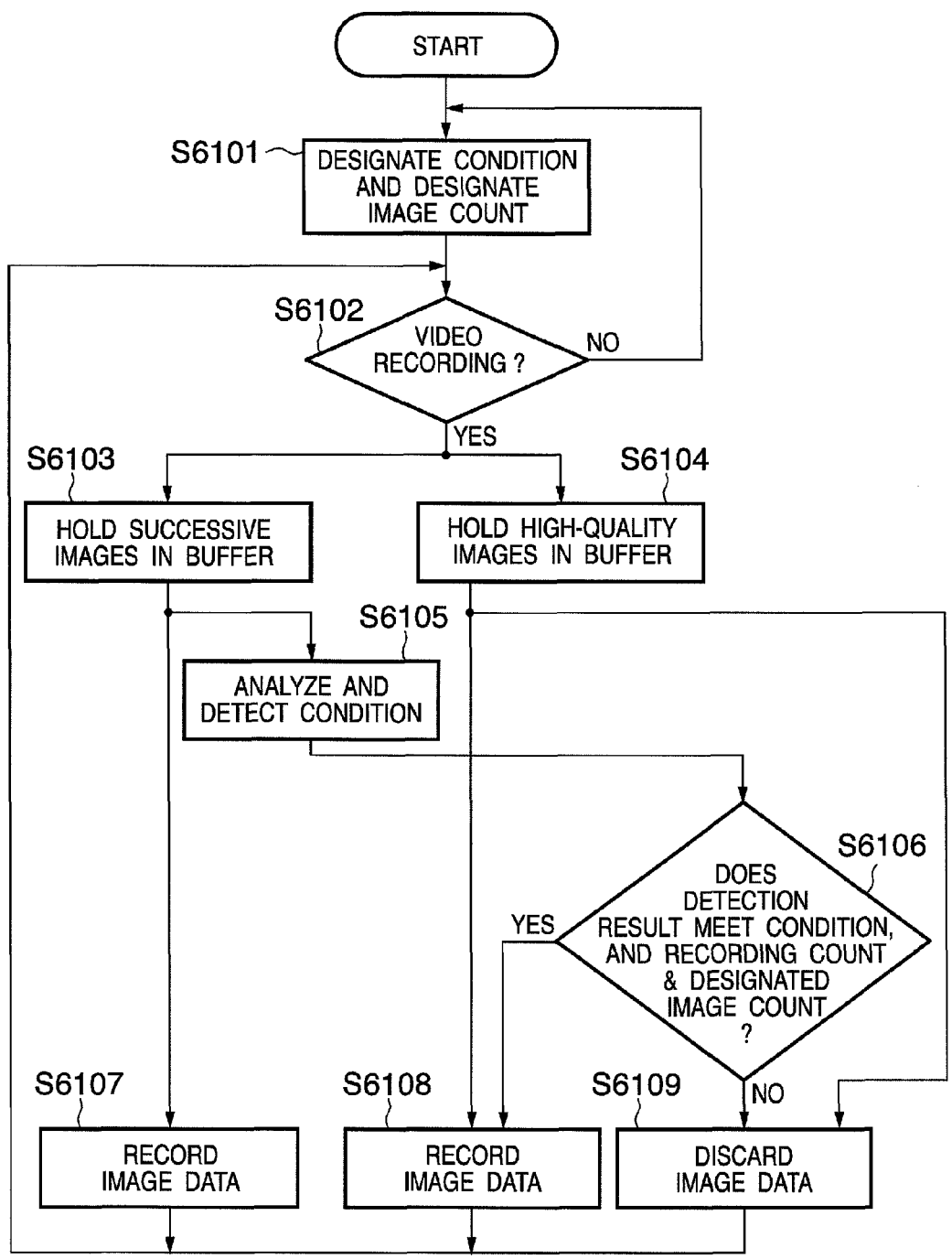
FIG. 13 is a flowchart showing the operation of the fourth embodiment according to the present invention.

FIG. 12 is a block diagram showing the configuration of an image capturing apparatus according to the fourth embodiment of the present invention. FIG. 13 is a flowchart showing the operation of the image capturing apparatus in FIG. 12.

In FIG. 12, reference numeral 61 denotes a user interface. The user interface 61 allows inputting instructions to adjust an optics 63 and zoom 64 for the view angle and auto focus of the camera and the like, an instruction to adjust a diaphragm 65, a recording (successive-image capturing) start/end instruction, designation of photographing conditions and an image condition (e.g., smile or blink prevention), and the like. Reference numeral 62 denotes a camera control circuit which performs zoom control and auto focus control for the optics 63 and zoom 64, drives the diaphragm 65, transfers a charge signal from an image capturing element 66 such as a CCD to buffer memories 67 and 68, and controls recording control circuits 610 and 611 for successive images.

Reference numerals 67 and 68 denote buffer memories. The buffer memory 68 stores, at a predetermined resolution, images which are successively captured at a predetermined rate (e.g., 30 msec/frame) in accordance with a recording start instruction from the camera control circuit 62. The buffer memory 67 is a high-quality buffer memory for a higher resolution and/or multi-tone in comparison with the buffer memory 68. The buffer memory 67 stores an image of one frame in accordance with a predetermined trigger signal output from the camera control circuit 62.

An image analyzing circuit 69 analyzes the contents of the buffer memory 68, and when they meet predetermined photographing conditions and image condition (e.g., smile or blink prevention), outputs a recording signal to the recording control circuit 610. Reference numerals 610 and 611 denote recording control circuits. The recording control circuit 611 records, on a recording medium 613, image data stored in the buffer memory 68 at a predetermined rate (e.g., 3 msec/frame) in accordance with a recording start instruction from the camera control circuit 62.

The recording control circuit 610 records, on a recording medium 612, image data of one frame that is stored in the buffer memory 67 only when a recording signal is input from the image analyzing circuit 69. The recording media 612 and 613 save image data for a long period, and examples of them are a magnetic tape, optical disk, and semiconductor memory (e.g., flash ROM). FIG. 12 shows two recording media, but one recording medium suffices when the memory can be accessed at random and allows writing separate data independently at two portions. Also when the memory can be accessed at random at a sufficiently high speed, the number of recording media can be decreased to one by performing time-division write.

The operation of the image capturing apparatus in FIG. 12 will be explained with reference to the flowchart of FIG. 13.

When the image capturing apparatus is turned on, a desired condition (e.g., smile or blink prevention) is set by a user operation (step S6101). At the same time, a desired image acquisition count is also set. When a desired condition is set but no image count is set, or when the image count is set larger than a count recordable on the recording medium 612, the maximum count recordable on the recording medium 612 may be set as a designated count. At this time, a warning to prompt the user to confirm the image count can also be output to the user interface 61.

It is determined whether to perform video recording (step S6102). In this case, it is generally determined whether the user presses the record button or a recording signal is input from an external device. If the start of video recording is detected, the camera control circuit 62 stores, in the buffer memory 68 at a predetermined resolution and update rate, image data captured by the image capturing element 66 (step S6103), and sequentially records the image data on the recording medium 613 (step S6107).

Simultaneously when frames are stored in step S6103, image data of high quality (high pixel count and/or multi-tone) are stored and held in the buffer memory 67 (step S6104). Once the image data are held, even if the buffer memory 68 is updated, the contents of the buffer memory 67 are held until a recording signal or discard signal is input. The contents of the buffer memory 68 at the same time as the storage time of the buffer memory 67 are transferred to the image analyzing circuit 69, and undergo condition analysis/detection processing under the condition (e.g., smile) designated by the user (step S6105). It is determined whether the detection result in step S6105 meets the designated condition (step S6106). In this case, whether the recording count is equal to or smaller than the designated count is determined on the basis of a count recorded in a counter 614. If the detection result in step S6105 meets the designated condition, a recording signal is output to the recording control circuit 610 to write the contents of the buffer memory 67 in the recording medium 612 and increment the counter 614. If no detection result in step S6105 meets the designated condition, a discard signal is output to the camera control circuit 62 to update the buffer memory 67 at the next storage timing of the buffer memory 68.

Figure 14:
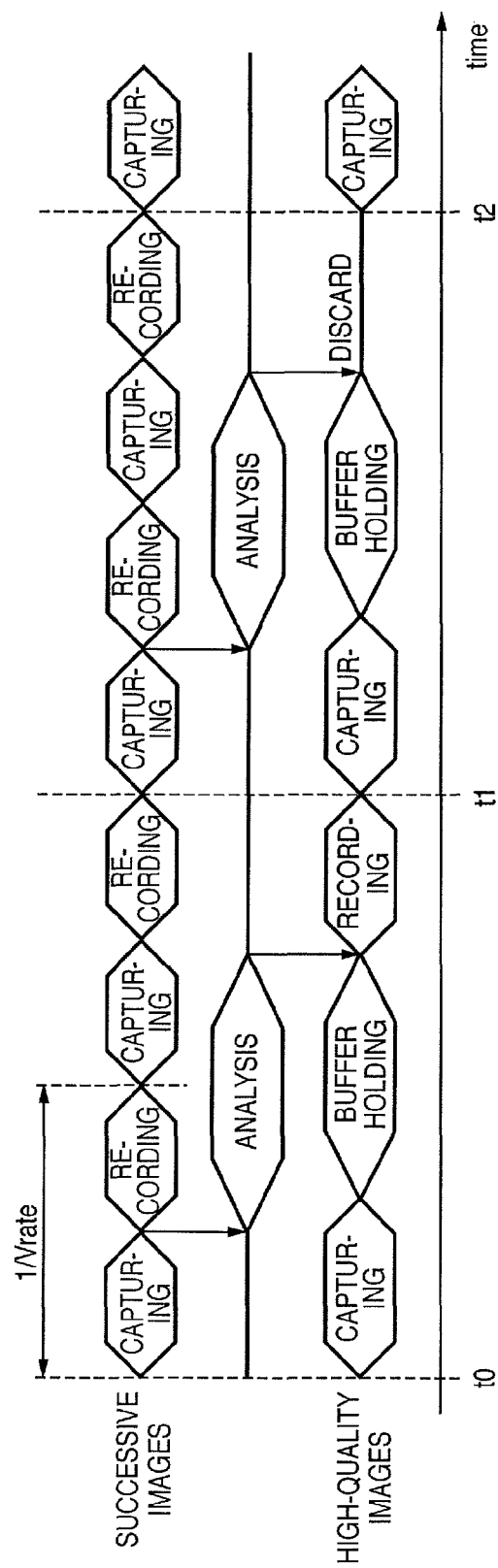
FIG. 14 is a timing chart showing the operation of the fourth embodiment according to the present invention.

FIG. 14 is a timing chart showing the above operation. In FIG. 14, Vrate represents the video rate, and successive images are updated at the frequency of the video rate Vrate. In FIG. 14, successive image data and high-quality image data are simultaneously stored in the buffer memories 67 and 68 at t0, t1, and t2, and analyzed using successive image data. In general, a high-quality image has a large data amount, and takes a long processing time. In this example, successive image data of two frames are used until high-quality image data is recorded on a recording medium.

Note that high-quality image data stored in the buffer memory 67 is not always recorded on the recording medium. The write frequency per unit time can be increased by preparing a write buffer memory, temporarily storing image data in it, and when no image data is saved, writing the image data in the buffer memory. It is also possible to prepare a plurality of buffer memories for storing high-quality image data and prepare the same number of buffer memories for analyzing and detecting a condition. In this case, even when image data which meet a designated condition are successively detected from successive images, they can be successively recorded on the recording medium unless the number of image data exceeds the number of frames of buffer memories.

Figure 15:
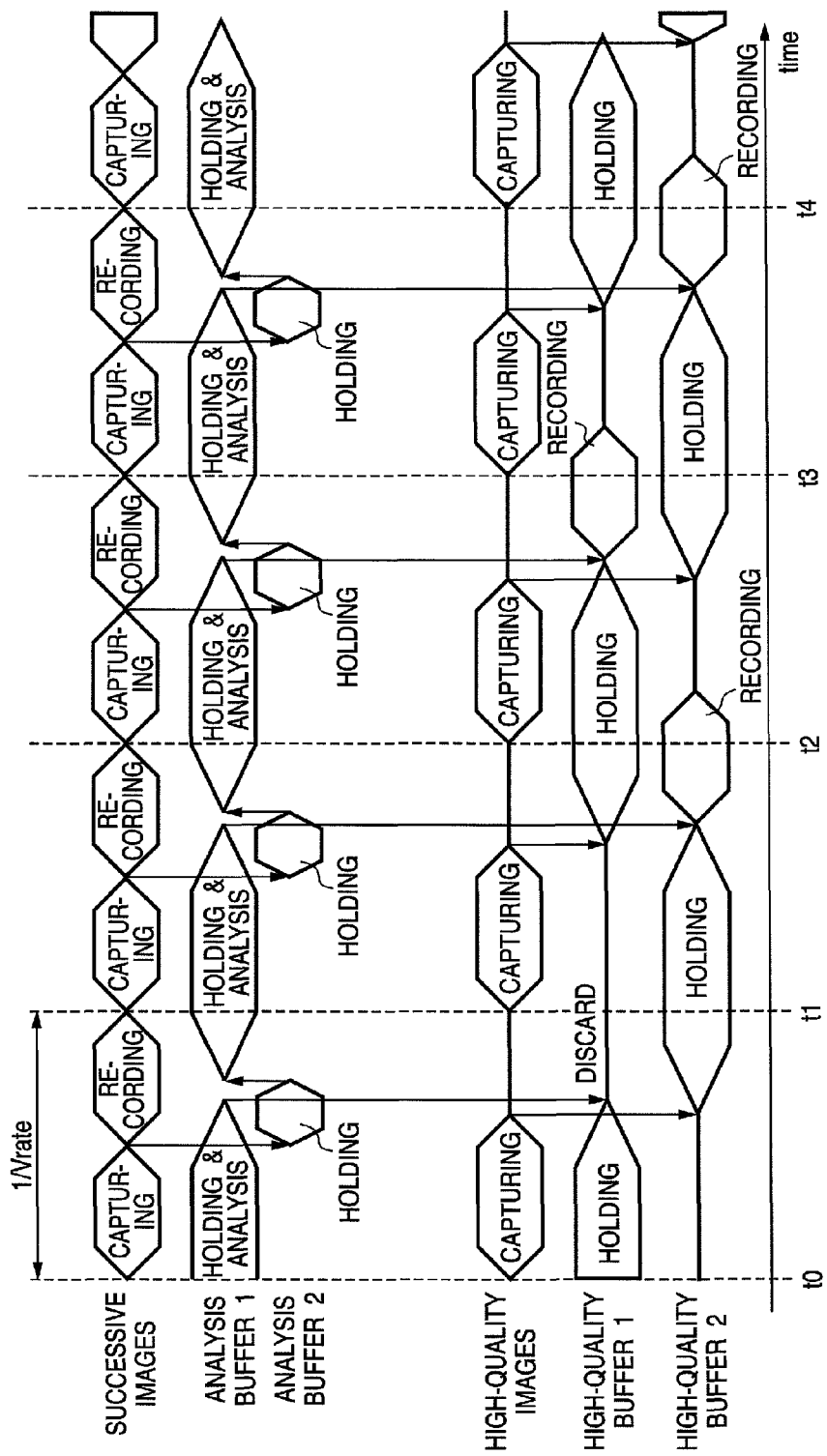
FIG. 15 is a timing chart showing another example of the operation of the fourth embodiment according to the present invention.
Figure 16:
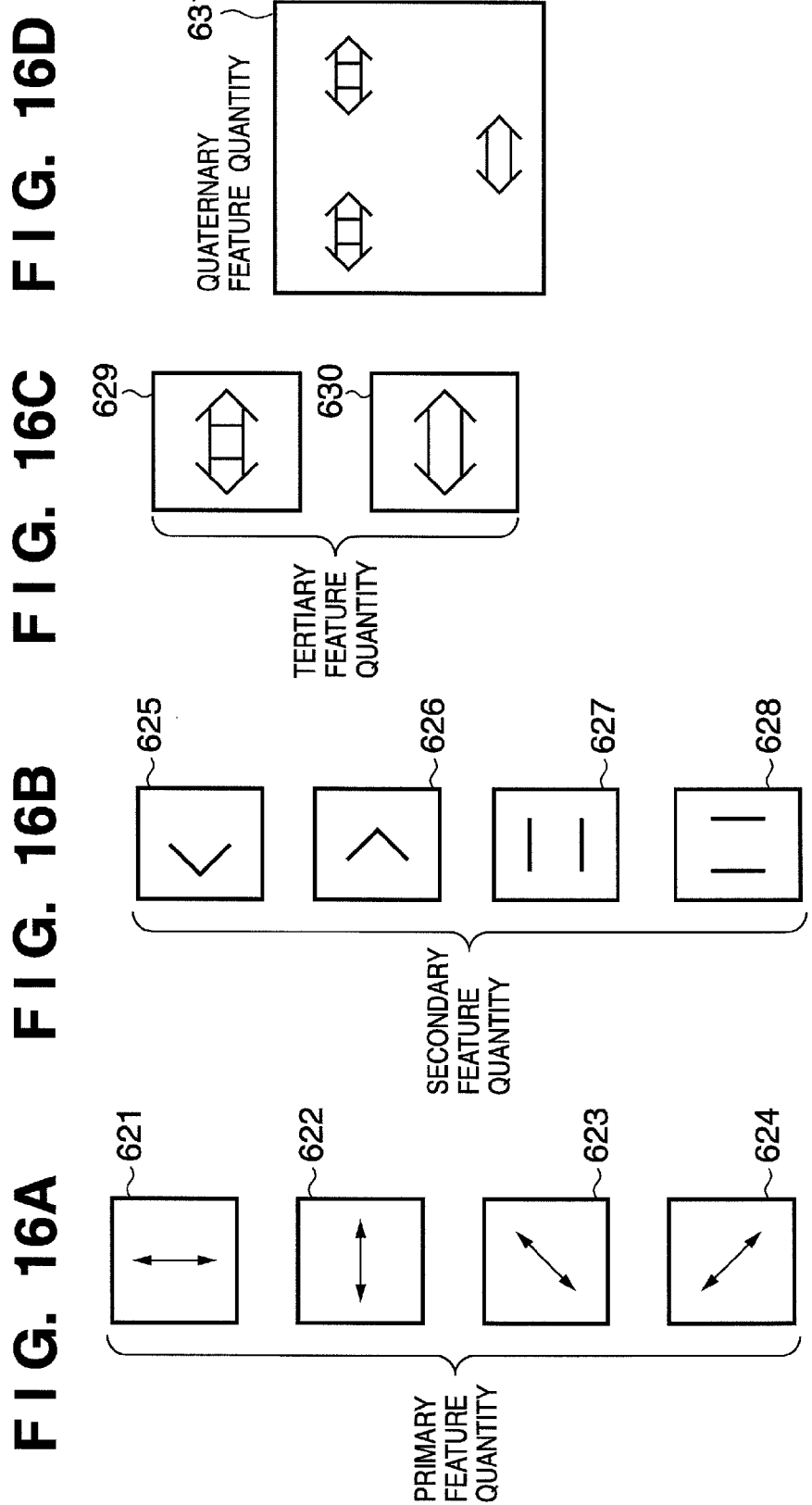
FIGS. 16A, 16B, 16C, and 16D are views for explaining a face detection method.

In the example of FIG. 15, buffer frames each of two frames are prepared, and high-quality image data are alternately stored in the two buffers at times t0, t1, t2, t3, ... by the same number of frames as successive image data. Analysis data are temporarily saved in an analysis buffer 62, and after all frames are analyzed, whether to record the frames can be determined to record the frames on the recording medium.

As a means for analyzing an object state, person detection, personal identification, facial expression recognition, shape recognition, and the like are possible. An example of performing person detection will be explained. To detect a person, it is desirable to use the face on which features of the person appear most. FIGS. 16A to 16D are views for explaining a series of processes for specifying a face area from photographed image data, which is described in the above-mentioned Japanese Patent Laid-Open No. 2004-294498.

Primary feature quantities 621 to 624 serving as simple line segments are extracted from an image (known extraction methods are wavelet transformation, neural net method, and the like). The primary feature quantities 621 to 624 are combined to extract secondary feature quantities 625 to 628, and the secondary feature quantities 625 to 628 are combined to extract tertiary feature quantities 629 and 630. In this example, the feature quantity 629 represents an eye, and the feature quantity 630 represents a mouth. The tertiary feature quantities 629 and 630 are further combined to extract a quaternary feature quantity 631 (face feature quantity). Whether the frame contains a face can be determined from the quaternary feature quantity 631, and a person can be detected. Since the positions and edges of parts (eyes, mouth, and the like) of a face in the image can be obtained by extracting tertiary feature quantities, a facial expression (e.g., a smile), blink, and the like can also be detected on the basis of the relative positional relationship between the parts in the image and the areas occupied by the parts. Note that FIGS. 16A to 16D show an example of person detection from an image. To perform person detection, personal identification, facial expression recognition, and shape identification, color information may be used, or template matching may be executed.

In this manner, according to the fourth embodiment, successive images and high-quality images are simultaneously acquired and temporarily saved using the same optics (the same view angle, focus, and diaphragm condition). Whether or not to record high-quality images can be selected using the frames of successive images of a smaller data capacity at the same timing. Thus, no photographing failure occurs because a photo opportunity for high-quality images can be obtained by subsequent analysis without preparing a large-size, high-speed recording medium for high-quality images. Since a designated count is automatically acquired by designating a recording count, the photographer can concentrate on moving image photographing, and can record, at high image quality without influencing recording of the moving image, an image with a photo opportunity such as an instantaneous facial expression which appears during moving image photographing.

Fifth Embodiment

Figure 17:
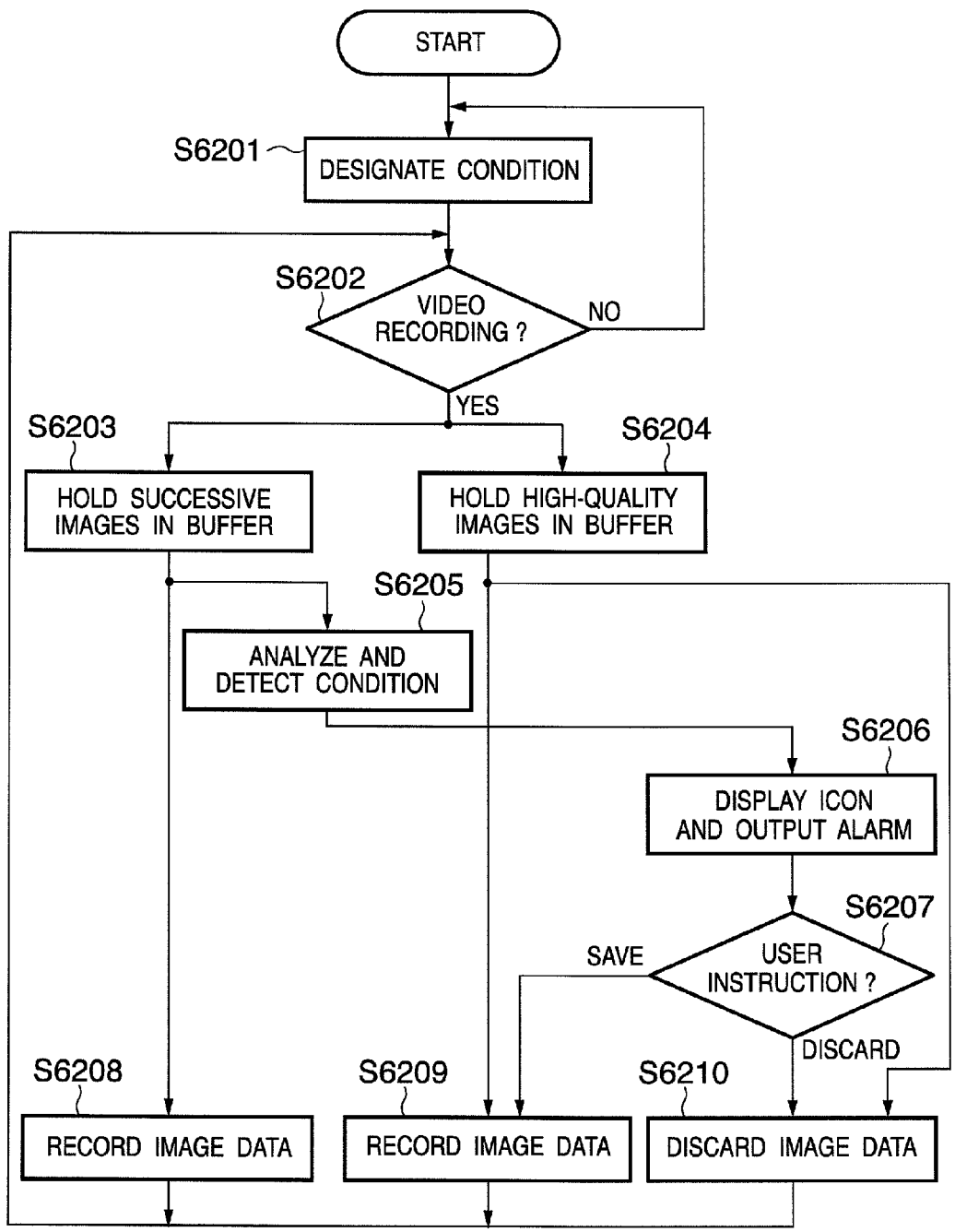
FIG. 17 is a flowchart showing the operation of the fifth embodiment according to the present invention.
Figure 18:
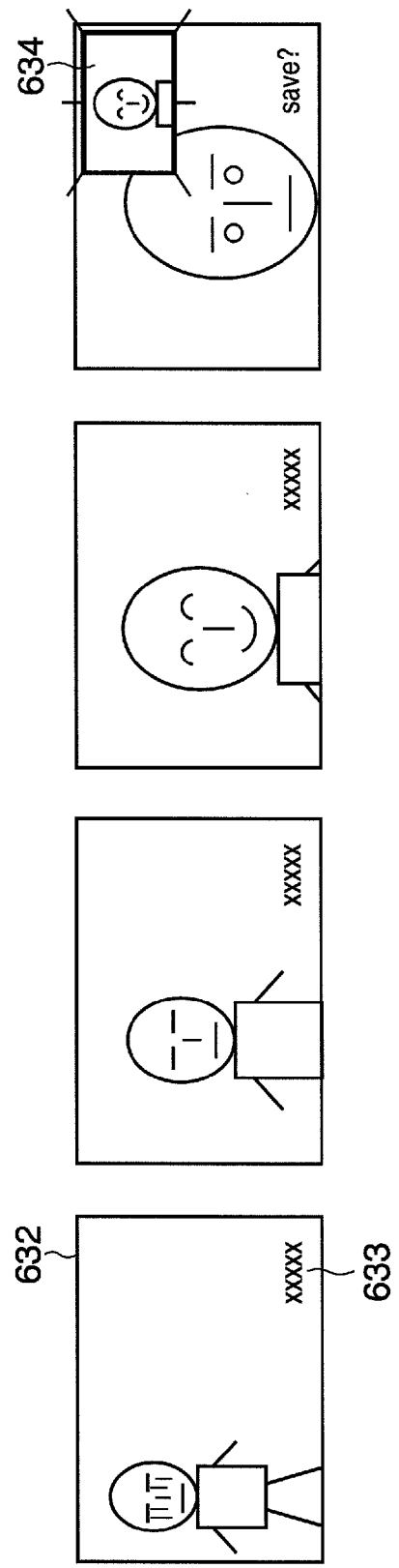
FIGS. 18A, 18B, 18C, and 18D are views showing a method of notifying the user according to the fifth embodiment of the present invention.

FIG. 17 is a flowchart showing the fifth embodiment according to the present invention.

In the fifth embodiment, unlike the fourth embodiment, only a desired condition (e.g., smile or blink prevention) is set by the user or the like (step S6201). Processing from step S6202 to step S6205 is the same as that in the fourth embodiment, and a description thereof will be omitted. If it is determined in step S6205 that one frame of a moving image acquired at the same time as a high-quality image to be saved satisfies the condition, a camera control circuit 62 notifies the user via a user interface 61 that a candidate image is obtained (step S6206). In step S6206, the user can recognize that the best shot candidate is acquired in a buffer memory 67. The user selects whether to save the image data (step S6207). On the basis of the user's selection, the image data is written on the recording medium (step S6209), or discarded (step S6210: in practice, overwrite is permitted).

The notification in step S6206 can be executed by various methods.

FIGS. 18A to 18D show an example of the notification operation in step S6206 when the user interface 61 is implemented by an image display unit 632 such as a liquid crystal display. When an image (in this case, a smile) which meets a condition is not detected, successive images, i.e., moving images are displayed on the image display unit 632 at a predetermined frame rate in FIGS. 18A and 18B. When a smile image is captured and detected by an image analyzing circuit 69 in FIG. 18C, an image 634 used for analysis is displayed over a moving image at that time in FIG. 18D subsequent to FIG. 18C to notify the user by text information 633 or the like that the target image has been obtained. At this time, it is effective to blink the image 634 at predetermined intervals or surround it with a bold or colored frame because such display can call the user's attention. For the same reason, an audio notification (e.g., verbal notification, musical piece, alarm, or animal's sound) can also be simultaneously output. In FIGS. 18A to 18D, the text information 633 is displayed by only a text, but an icon or both the icon and text can also be displayed. Superposition of the moving image and detected image continues until the user or the like selects save or discard (step S6207). The configuration can also be designed to interpret that the user selects discard when he inputs no save instruction for a predetermined period after the notification in step S6206 is executed, instead of an explicit discard instruction. According to this method, a moving image is displayed large, which is effective when a moving image is more weighted.

Figure 19:
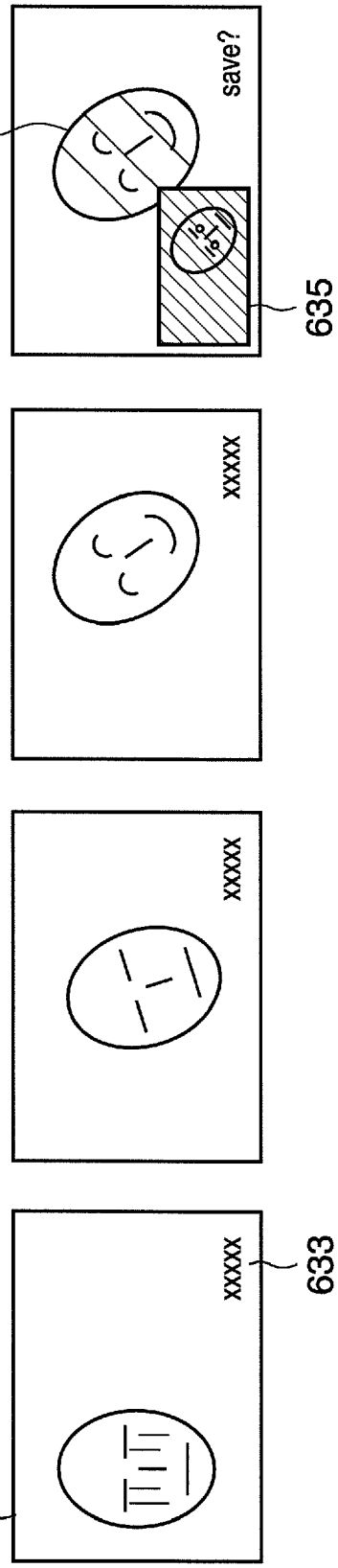
FIGS. 19A, 19B, 19C, and 19D are views showing another example of the method of notifying the user according to the fifth embodiment of the present invention.

FIGS. 19A to 19D show another example of executing notification in step S6206. Processing for FIGS. 19A to 19C is the same as that for FIGS. 18A to 18C, and a description thereof will be omitted. When a smile image is captured and detected by the image analyzing circuit 69 in FIG. 19C, the smile image is displayed again at a main portion in FIG. 19D subsequent to FIG. 19C. A moving image at that time is overwritten and displayed on a part 635 of the image (in FIG. 19D, the part 635 is displayed in dots for descriptive convenience, and no dot is displayed in practice). The area 635 is arranged at such a position as to minimize the overlapping portion between an area 636 (in FIG. 19D, the area 636, is displayed with hatched lines for descriptive convenience, and no hatched line is displayed in practice) detected by the image analyzing circuit 69, and the area 635 where the moving image at that time is overwritten. At this time, the user is notified by the text information 633 or the like that the target image has been obtained. Similar to FIG. 18D, the user's attention can be called by blinking the image at predetermined intervals, surrounding it with a bold or colored frame, outputting an audio notification, or displaying an icon. According to this method, a detected image is displayed large, which is effective when a high-quality image is more weighted.

The fifth embodiment has an advantage to allow the user to select a detected image according to his preference. The fifth embodiment can, therefore, prevent a shortage of storage locations when the needs arise in the case wherein the capacity of a recording medium for saving high-quality images is small and unnecessary images are captured.

Sixth Embodiment

Figure 20:
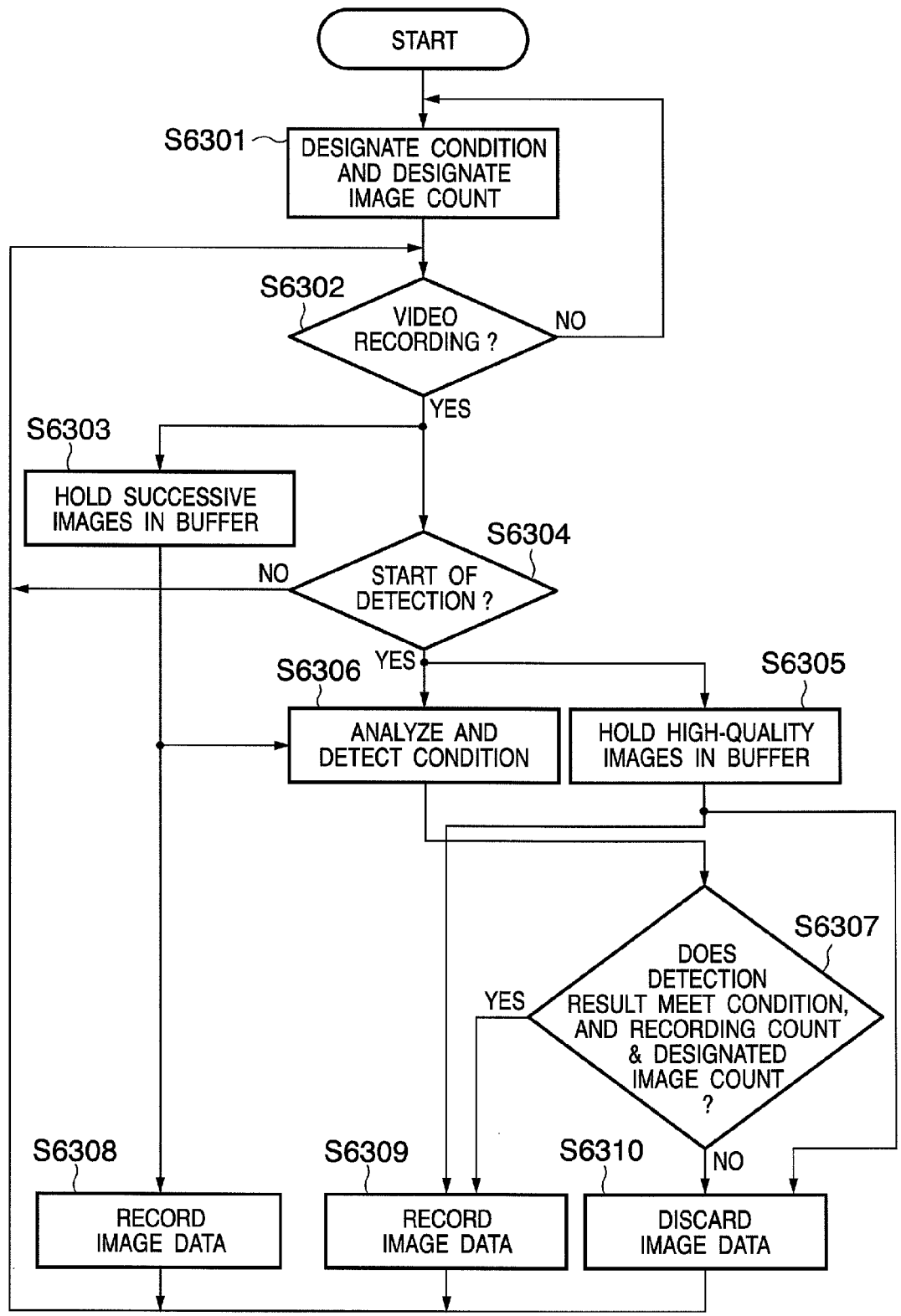
FIG. 20 is a flowchart showing the operation of the sixth embodiment according to the present invention.

FIG. 20 is a flowchart showing the sixth embodiment according to the present invention.

Processes in step S6301 to step S6303 and step S6308 are the same as step S6101 to step S6103 and step S6107 in the fourth embodiment. If video recording is selected in step S6302, images are captured at predetermined intervals (step S6303), and recorded on the recording medium (step S6308). If the user inputs a detection start instruction in step S6304 in the successive image recording state, the same processing as that in the fourth embodiment is executed. More specifically, after step S6304, a high-quality image is held in the buffer memory (step S6305), condition analysis/detection processing for frames of successive images at the same time is performed (step S6306), whether or not to hold an image is determined (step S6307), image data is recoded on the recording medium (step S6309), and high-quality image data is discarded (step S6310).

A unit for inputting a detection start instruction in step S6304 is provided to a user interface 61 in FIG. 12, and inputs with a push switch and joy stick and by the line of sight, brain wave, and the like are conceivable. The sixth embodiment can be exploited in, for example, a case wherein the moment when a child reaches the goal is photographed while the running child in an athletic meeting or the like is recorded, or a case wherein the flap of a bird is recorded and the moment when it sits in a tree is photographed. In these scenes, the target is small at the start of recording, and it may be difficult to automatically determine the target. When another child or bird is near the photographing target, an unnecessary image may be captured.

Figure 21A:
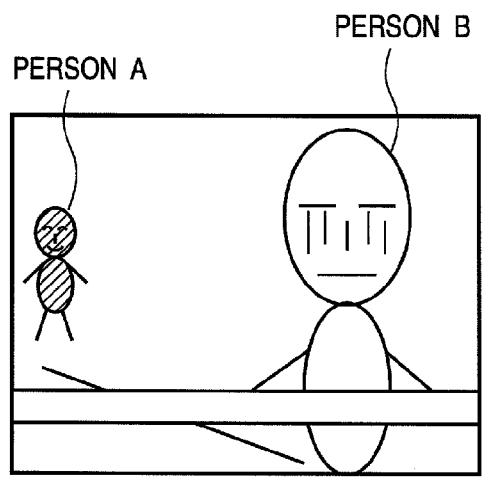
FIGS. 21A and 21B are views for explaining the effect of the sixth embodiment according to the present invention.
Figure 21B:
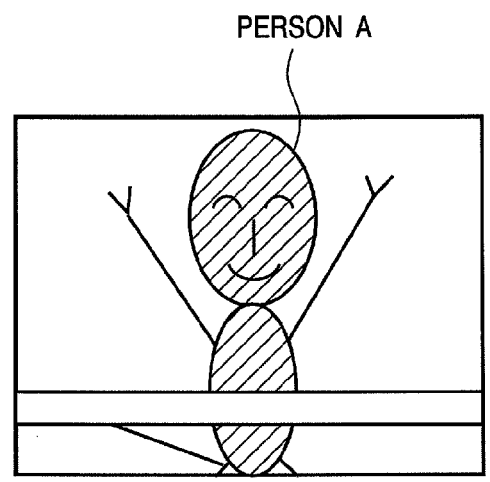
Figure 22:
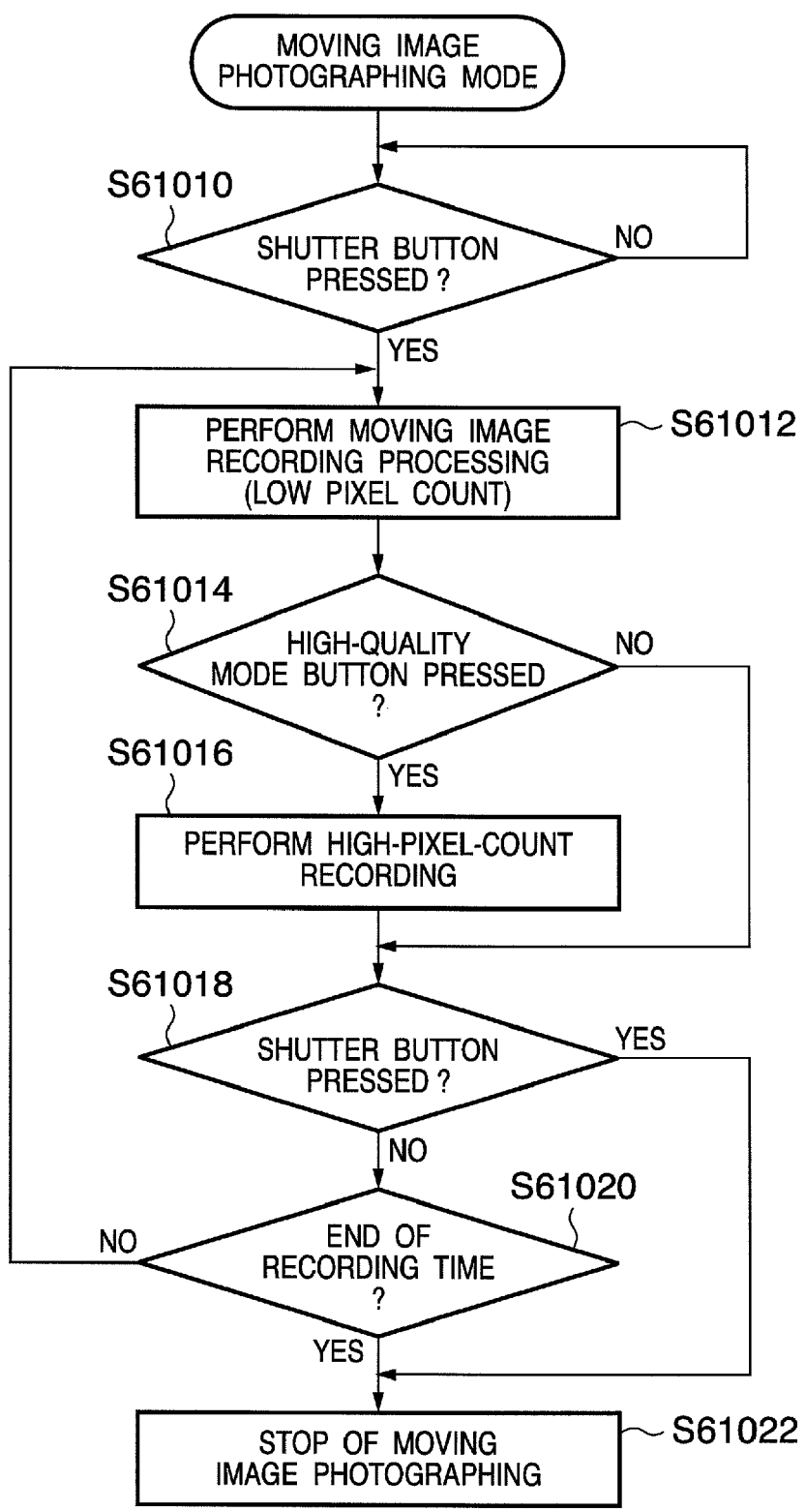
FIG. 22 is a flowchart showing a conventional moving image & high-pixel-count recording operation by an image capturing apparatus.
Figure 23:
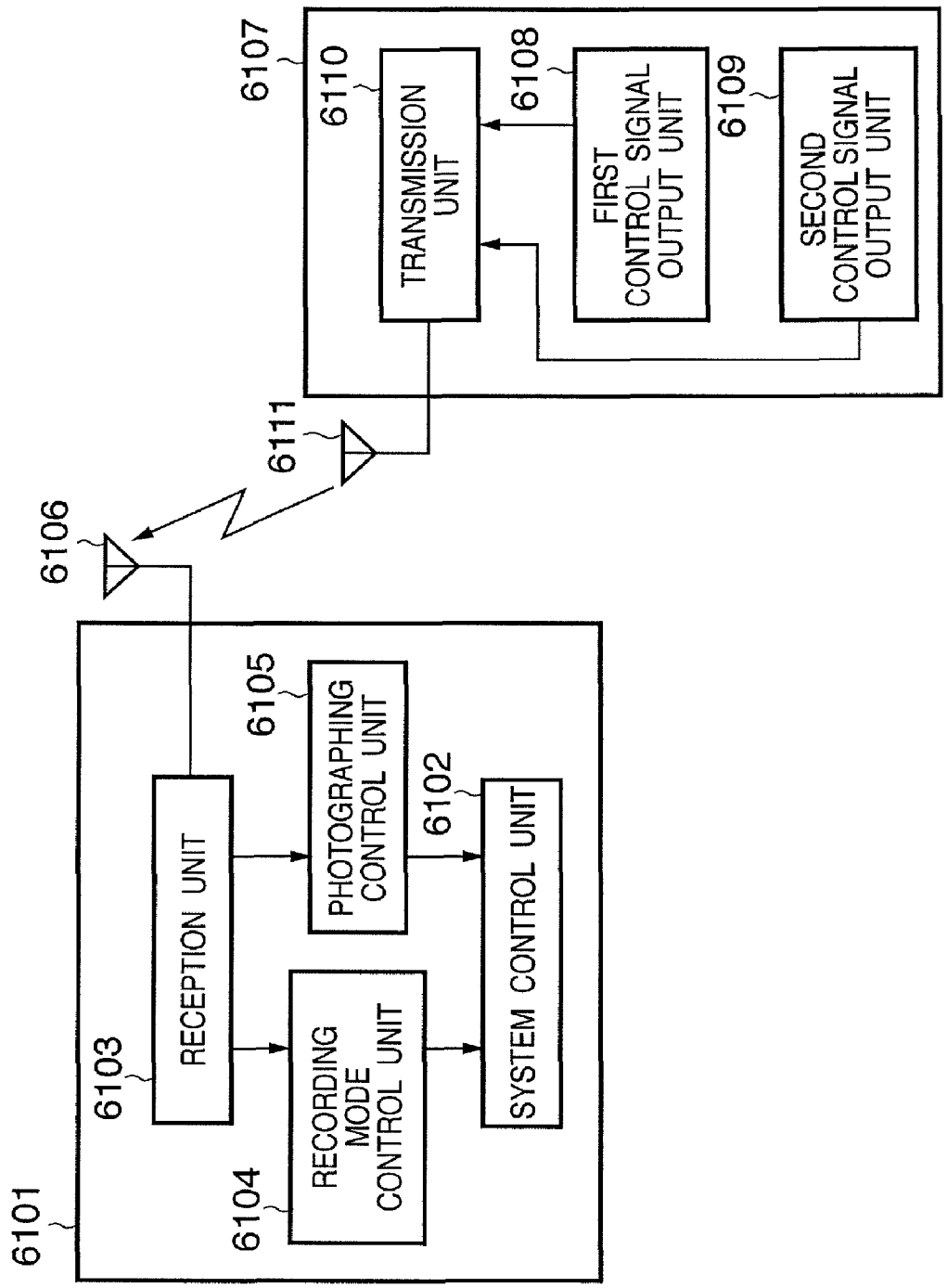
FIG. 23 is a block diagram showing another example of the conventional moving image & high-pixel-count recording operation.
Figure 24:
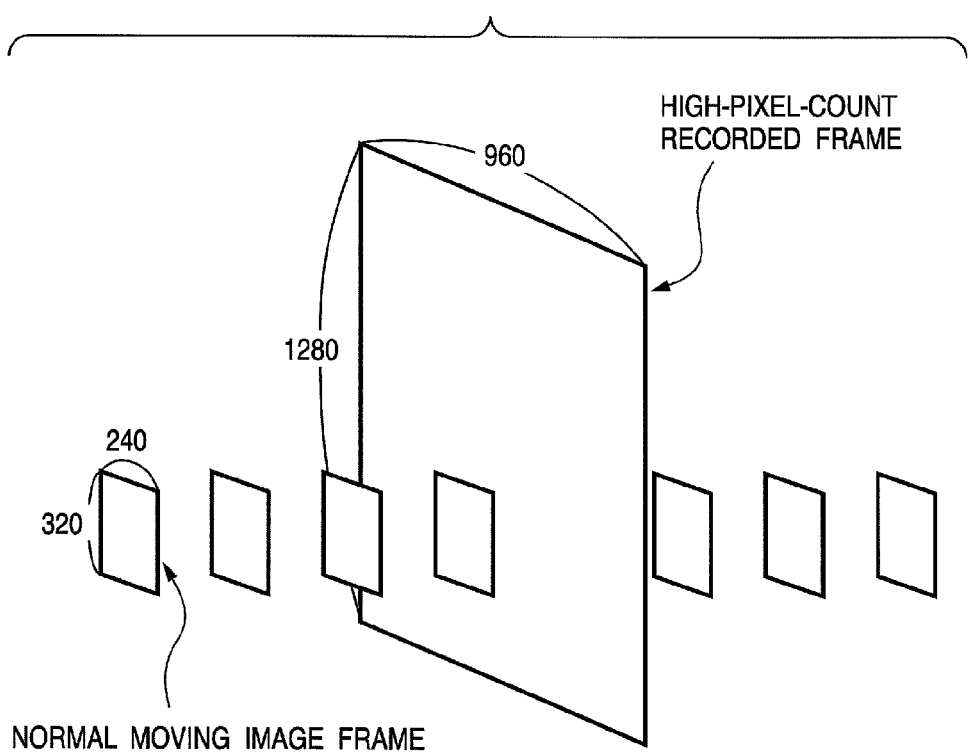
FIG. 24 is a view for explaining the conventional moving image & high-pixel-count recording operation.
Figure 25:
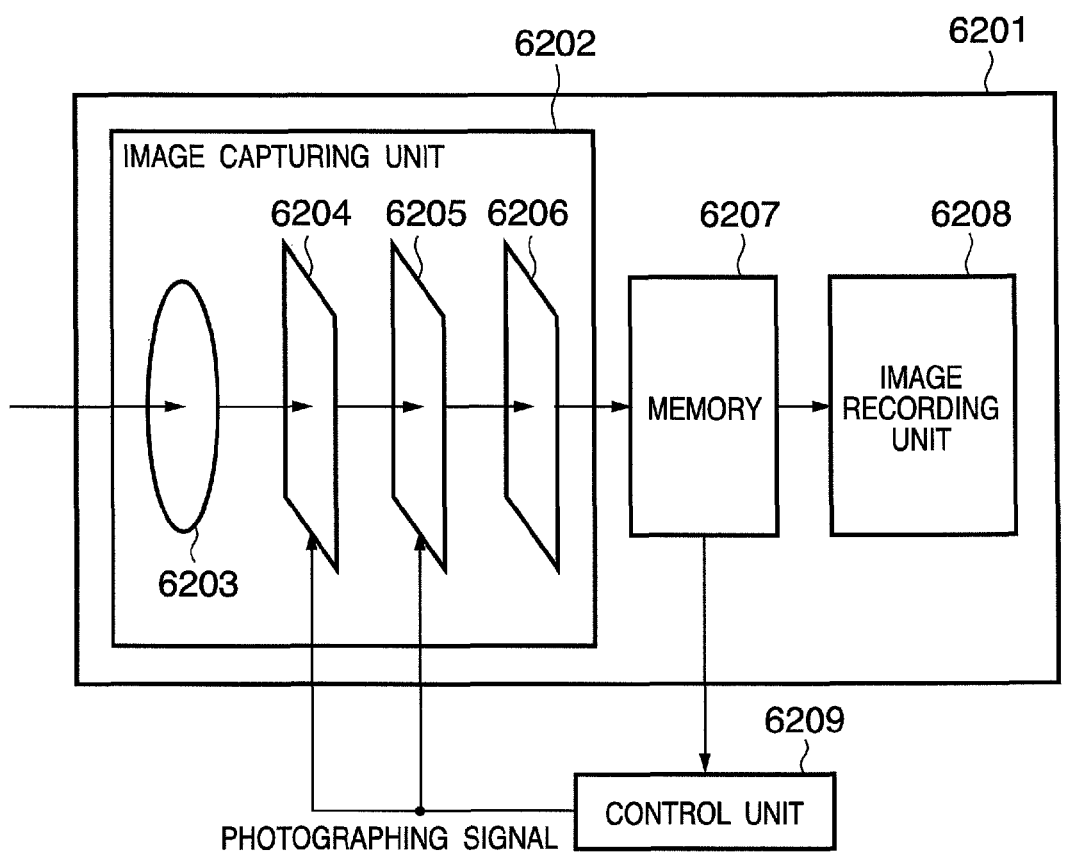
FIG. 25 is a block diagram showing a conventional image capturing apparatus which automatically determines an object state and photographs an image.

This situation corresponds to, e.g., a case in FIGS. 21A and 21B. FIGS. 21A and 21B show scenes at the start of recording and at the moment when a child (person A in FIGS. 21A and 21B) reaches the goal. In the scene of FIG. 21A, an unnecessary object (person B) is larger than the target (person A). Matching determination may be done for person B in step S6307 to capture an unwanted image. As a result, the capacity of the recording medium is consumed, and no high-quality image may be recorded in the necessary scene of FIG. 21B. To prevent this problem, the user determines a rough state of a target and designates the start timing of detection (in FIGS.

21A and 21B, detection starts when person A runs close to the goal), thereby greatly reducing the possibility of acquiring wasteful images. Even in this case, there is no fear of omitting the frames of moving images, unlike a conventional hybrid camera, or missing a decisive opportunity, unlike a case wherein the shutter is manually released.

The load on the camera control circuit 62 is small when no detection start instruction is input in step S6304. Hence, the sixth embodiment can advantageously reduce power consumption and increase the frequency of another control (auto focus or diaphragm adjustment), in comparison with the fourth embodiment in which a high-quality image is always buffered and analyzed in recording.

As has been described above, according to the present embodiment, moving images which are successively photographed, and high-quality still images can be simultaneously photographed, and high-quality still images can be photographed without influencing moving image photographing and missing any photo opportunity.

Other Embodiment

The embodiments of the present invention have been described in detail above. The present invention can take an embodiment as a system, apparatus, method, program, storage medium, or the like. More specifically, the present invention may be applied to a system including a plurality of devices or an apparatus formed by a single device.

The present invention is also achieved by supplying a program for implementing the functions of the above-described embodiments to a system or apparatus directly or from a remote place, and reading out and executing the supplied program codes by the computer of the system or apparatus.

Hence, program codes themselves installed in the computer in order to implement functional processing of the present invention by the computer also fall within the technical scope of the present invention. That is, the present invention includes a computer program itself for implementing functional processing of the present invention.

In this case, the present invention may take the form of an object code, a program executed by an interpreter, or script data supplied to an OS as long as a program function is attained.

Examples of a recording medium for supplying the program are a Floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply form, the computer program according to the present invention may be downloaded from an Internet Web page by connecting a client computer to the Internet Web page via the browser of the client computer, or a compressed file containing an automatic installing function may be downloaded to a recording medium such as a hard disk. The program can also be implemented by grouping program codes which form the program of the present invention into a plurality of files, and downloading the files from different Web pages. That is, the present invention also includes a WWW server which allows a plurality of users to download the program files for implementing functional processing of the present invention by a computer.

The following supply form is also conceivable. That is, the program according to the present invention is encrypted, stored in a recording medium such as a CD-ROM, and distributed to the user. A user who satisfies predetermined conditions is prompted to download decryption key information from a Web page via the Internet. The user executes the encrypted program using the key information, and installs the program in the computer, implementing the configuration according to the present invention. This supply form is also possible.

The functions of the above-described embodiments are implemented when the computer executes the readout program codes. The following embodiment is also assumed. That is, an OS or the like running on the computer performs some or all of actual processing on the basis of the instructions of the program. This processing can also implement the functions of the above-described embodiments.

Further, the functions of the above-described embodiments are implemented on the basis of instructions of a program when the program read out from the recording medium is written in the memory of a function expansion board inserted into the computer or the memory of a function expansion unit connected to the computer. That is, the CPU of the function expansion board or function expansion unit performs some or all of actual processing. This processing can also implement the functions of the above-described embodiments.

As has been described above, the present invention can provide a technique associated with an image capturing apparatus which does not require any large-capacity memory and can acquire an image in a more proper state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-215981, filed Jul. 26, 2005 and Japanese Patent Application No. 2005-272885, filed Sep. 20, 2005, which are hereby incorporated by reference herein in their entirety.

What is claimed is:

1. An image capturing apparatus comprising:
   an image capturing unit adapted to capture a moving image of an object and to acquire still image data and moving image data, wherein the still image data is acquired at the same time as a corresponding frame of the moving image data and wherein the still image data has at least one of a high resolution and multi-tone in comparison with the moving image data;
   a holding control unit adapted to have a first buffer temporarily hold the still image data, and to have a second buffer temporarily hold the moving image data;
   an analysis unit adapted to analyze a state of the object in a frame of the moving image data corresponding to still image data held in the first buffer; and
   a recording control unit adapted (a) to control successively recording of the moving image data held in the second buffer on a recording medium, (b) to control recording of the still image data held in the first buffer on the recording medium if an analysis result of a corresponding frame of the moving image data by said analysis unit satisfies a capturing condition, and (c) to control discarding of the still image data held in the first buffer without recording on the recording medium if the analysis result of the corresponding frame of the moving image data does not satisfy the capturing condition.

2. The apparatus according to claim 1, wherein the first buffer and the second buffer comprise a plurality of first buffers and a plurality of second buffers, and
   wherein a plurality of combinations of the still image data and the moving image data are held.

3. The apparatus according to claim 1, wherein the recording medium comprises a plurality of recording media, and
wherein the still image data is recorded on a first recording medium, and the moving image data is recorded on a second recording medium.

4. The apparatus according to claim 1, wherein said analysis unit executes at least one of person detection, personal identification, facial expression recognition, and shape identification for the moving image data.

5. The apparatus according to claim 1, further comprising:
a setting unit adapted to set a condition for executing analysis by said analysis unit; and
a designation unit adapted to designate the number of images to be recorded on the recording medium,
wherein the still image data which satisfy the condition are sequentially recorded on the recording medium, and when the still image data reach the number of images designated by said designation unit, recording of the still image data ends.

6. The apparatus according to claim 5, further comprising an instruction unit adapted to indicate a start of acquiring the still image data and the moving image data,
wherein the recording control unit controls, when no start of acquisition is indicated, not to record the still image data, but to record the moving image data on the recording medium, and
wherein the recording control unit controls, when the start of acquisition is indicated, to sequentially record the still image data which satisfy the condition on the recording medium, and when the still image data reach the number of images designated by said designation unit, to end recording of the still image data.

7. The apparatus according to claim 5, further comprising:
a notification unit adapted to make a notification that the still image data which satisfies the condition exists; and
a determination unit adapted to determine whether to record the still image data on the recording medium after the notification by said notification unit,
wherein when said determination unit indicates recording of the still image data, the still image data is recorded on the recording medium, and when said determination unit indicates discard of the still image data, the still image data is discarded.

8. The apparatus according to claim 7, further comprising a display unit adapted to display the still image data which satisfies the condition,
wherein when the still image data which satisfies the condition is not detected, said display unit displays the moving image data, and when the still image data which satisfies the condition is detected, said display unit distinguishably displays the still image data and the moving image data.

9. The apparatus according to claim 8, wherein when the still image data and the moving image data overlap each other and are displayed, said display unit lays out the still image data and the moving image data so as to minimize an area where the still image data and the moving image data overlap each other.

10. The apparatus according to claim 7, wherein when the recording is not indicated within a predetermined time, said determination unit determines that discard is indicated.

11. An image capturing method comprising:
an image capturing step of capturing a moving image of an object and acquiring still image data and moving image data, the still image data is acquired at the same time as a corresponding frame of the moving image data and the still image data has at least one of a high resolution and multi-tone in comparison with the moving image data;
a data holding step of temporarily holding the still image data in a first buffer, and temporarily holding the moving image data in a second buffer;
an analysis step of analyzing a state of the object in a frame of the moving image data corresponding to still image data held in the first buffer; and
a recording control step of (a) controlling to successively record the moving image data held in the second buffer on the recording medium, (b) controlling recording of the still image data held in the first buffer on the recording medium if an analysis result of a corresponding frame of the moving image data in the analysis step satisfies a capturing condition, and (c) controlling discarding of the still image data held in the first buffer without recording on the recording medium if the analysis result of the corresponding frame of the moving image data does not satisfy the capturing condition.

12. A computer-readable storage medium which stores a program which causes a computer to execute an image capturing method defined in claim 11.

13. The apparatus according to claim 1, wherein the capturing condition relates to a smile condition of the corresponding frame of the moving image data.

14. The apparatus according to claim 1, wherein the capturing condition relates to a blink condition of the corresponding frame of the moving image data.

* * * * *